(12) United States Patent
Auger et al.

(10) Patent No.: US 12,478,760 B2
(45) Date of Patent: Nov. 25, 2025

(54) SYSTEMS AND METHODS FOR USER ENTRAINMENT

(71) Applicant: INTO Technologies Inc., Santa Fe, NM (US)

(72) Inventors: Stephen Auger, Santa Fe, NM (US); Jeffrey S. Bova, West Hollywood, CA (US)

(73) Assignee: INTO Technologies Inc., San Francisco, CA (US)

( * ) Notice: Subject to any disclaimer, the term of this patent is extended or adjusted under 35 U.S.C. 154(b) by 1064 days.

(21) Appl. No.: 16/937,124

(22) Filed: Jul. 23, 2020

(65) Prior Publication Data

US 2021/0023332 A1 Jan. 28, 2021

Related U.S. Application Data

(60) Provisional application No. 63/049,203, filed on Jul. 8, 2020, provisional application No. 62/961,435, filed
(Continued)

(51) Int. Cl.
*A61M 21/02* (2006.01)
*A61B 5/00* (2006.01)
*A61M 21/00* (2006.01)

(52) U.S. Cl.
CPC .......... *A61M 21/02* (2013.01); *A61B 5/4812* (2013.01); *A61M 2021/0027* (2013.01);
(Continued)

(58) Field of Classification Search
CPC .......... A61M 21/02; A61M 2021/0027; A61M 2021/0044; A61M 2230/005
(Continued)

(56) References Cited

U.S. PATENT DOCUMENTS 4,315,502 A * 2/1982 Gorges .................. A61M 21/00
600/27
5,036,858 A * 8/1991 Carter .................... A61B 5/375
600/545
(Continued)

FOREIGN PATENT DOCUMENTS

GB 2393786 A 4/2004
WO 2013/121381 A1 8/2013

OTHER PUBLICATIONS

Alan M. Jimenez, "Physiological sensor", Electronic Theses and Dissertations, Nov. 2013, available at https://ir.library.louisville.edu/cgi/viewcontent.cgi?article=1688&context=etd (retrieved Aug. 12, 2020).
(Continued)

*Primary Examiner* — Charles A Marmor, II
(74) *Attorney, Agent, or Firm* — Michele V. Frank; Venable LLP

(57) ABSTRACT

A system for altering the brain state of a user is disclosed. The system may receive, from at least one sensor, data associated with one or more biometric markers of the user, and determine a brain state of the user based on the data associated with the one or more biometric markers of the user. The system may determine a desired altered cognitive/emotional state of the user (or a desired brainwave state), and cause one or more emitters to apply a stimulus or stimuli to the user.

13 Claims, 23 Drawing Sheets

Related U.S. Application Data on Jan. 15, 2020, provisional application No. 62/877,602, filed on Jul. 23, 2019.

(52) U.S. Cl.
CPC ............... *A61M 2021/0044* (2013.01); *A61M 2230/005* (2013.01); *A61M 2230/08* (2013.01)

(58) Field of Classification Search
USPC ..................................................... 600/26, 27
See application file for complete search history.

(56) References Cited

U.S. PATENT DOCUMENTS

| | | | | |
|---|---|---|---|---|
| 5,306,228 | A * | 4/1994 | Rubins | A61M 21/00 |
| | | | | 600/27 |
| 5,518,497 | A * | 5/1996 | Widjaja | A61M 21/00 |
| | | | | 600/26 |
| 5,694,939 | A | 12/1997 | Cowings | |
| 5,709,645 | A | 1/1998 | Siever | |
| 5,896,457 | A * | 4/1999 | Tyrrel | H04S 1/00 |
| | | | | 84/464 R |
| 6,299,632 | B1 * | 10/2001 | Jaillet | A61M 21/00 |
| | | | | 600/27 |
| 2002/0007105 | A1 | 1/2002 | Prabhu et al. | |
| 2002/0029071 | A1 | 3/2002 | Whitehurst | |
| 2008/0125620 | A1 | 5/2008 | McNew | |
| 2008/0269629 | A1 | 10/2008 | Reiner | |
| 2010/0152620 | A1 | 6/2010 | Ramsay et al. | |
| 2010/0280338 | A1 | 11/2010 | Chou | |
| 2011/0251535 | A1 | 10/2011 | Bender | |
| 2011/0301433 | A1 | 12/2011 | Sadowsky et al. | |
| 2012/0150545 | A1 | 6/2012 | Simon | |
| 2012/0215291 | A1 | 8/2012 | Pugh et al. | |
| 2013/0009761 | A1 | 1/2013 | Horseman | |
| 2013/0085346 | A1 | 4/2013 | Lin et al. | |
| 2013/0184516 | A1 * | 7/2013 | Genereux | A61M 21/02 |
| | | | | 600/28 |
| 2014/0024912 | A1 | 1/2014 | Dalke | |
| 2014/0276112 | A1 | 9/2014 | Fung et al. | |
| 2014/0303428 | A1 * | 10/2014 | Berka | A61B 5/6803 |
| | | | | 600/27 |
| 2014/0316230 | A1 | 10/2014 | Denison et al. | |
| 2015/0079560 | A1 | 3/2015 | Cowan | |
| 2015/0272459 | A1 | 10/2015 | Dalke | |
| 2016/0158485 | A1 | 6/2016 | Givertz et al. | |
| 2016/0235323 | A1 | 8/2016 | Tadi et al. | |
| 2017/0189640 | A1 | 7/2017 | Sadwick | |
| 2017/0231490 | A1 | 8/2017 | Toth et al. | |
| 2017/0241622 | A1 | 8/2017 | Du et al. | |
| 2018/0014741 | A1 | 1/2018 | Chou | |
| 2018/0133507 | A1 | 5/2018 | Malchano et al. | |
| 2018/0219987 | A1 | 8/2018 | Pantel | |
| 2019/0070386 | A1 | 3/2019 | Raut et al. | |
| 2019/0143073 | A1 | 5/2019 | Grossman et al. | |

OTHER PUBLICATIONS

EVu TPS, "Clinical Power At Your Fingertip", available at http://thoughttechnology.com/pdf/tps/MAR1103-00-TPS%20Brochure.pdf (retrieved Aug. 12, 2020).
"EVu TPS Sensor Launch: The Wireless Triple Physiology Sensor—Webinar | Thought Technology", Dec. 22, 2016, https://www.youtube.com/watch?v=GDjrtP5uEV4&feature=youtu.be (retrieved Aug. 5, 2020).
"EVu TPS User Guide", Mar. 2017, available at http://thoughttechnology.com/pdf/tps/SA4504%20Rev.0%20TPS%20Manual%20User%20Guide.pdf (retrieved Aug. 12, 2020).
"eVu Senz—TPS", available at http://thoughttechnology.com/pdf/tps/SA4508-Evu%20Senz%20-%20TPS%20APP%20Manual.pdf (retrieved Aug. 12, 2020).
"Enterprise Neurotechnology Solutions", https://www.emotiv.com/workplace-wellness-safety-and-productivity-mn8/ (retrieved Aug. 5, 2020).
"MyEmotiv", https://www.emotiv.com/myemotiv/ (retrieved Aug. 5, 2020).
John H. Gruzelier et al., "Physiological self-regulation: Biofeedback and neurofeedback", Jan. 2004, available at https://www.researchgate.net/publication/237449969 (retrieved Aug. 12, 2020).
The Brain Lady, "Mindfulness Skills for Everyday Use", https://thebrainlady.com/services/neurofeedback-and-self-regulation/ (retrieved Aug. 5, 2020).
"Catch a (Brain) Wave", https://brainworldmagazine.com/catch-a-brain-wave/ (retrieved Aug. 5, 2020).
"NeuroSync Brain Computer Interface", https://www.amazon.com/neurosync-brain-computer-interface-others/dp/b0143q5m2 (retrieved Aug. 5, 2020).
Winston Ross, "Rewiring Your Brain: Neurofeedback Goes Mainstream", Newsweek Magazine, May 9, 2016, available at https://www.newsweek.com/2016/05/20/neurofeedback-brain-regulation-neuroscience-457492.html (retrieved Aug. 6, 2020).
"Brain Core Neurofeedback, How We Collect & Learn from Brainwaves", https://braincoretherapy.com/brainwaves/ (retrieved Aug. 5, 2020).
Hengameh Marzbani et al., "Methodological Note: Neurofeedback: A comprehensive Review on System Design, Methodology and Clinical Applications", Basic and Clinical Neuroscience, Apr. 2016.
Sam Brinson, "Hacking Your Brain Waves: A Guide to Wearable Meditation Headsets", Jan. 29, 2017, available at https://www.diygenius.com/hacking-your-brain-waves/ (retrieved Aug. 5, 2020).
Sydney Johnson, "Brainwave Headsets Are Making Their Way Into Classrooms-For Meditation and Discipline", EdSurge, Nov. 14, 2017, available at https://www.edsurge.com/news/2017-11-14-brainwave-headsets-are-making-their-way-into-classrooms-for-meditation-and-discipline (retrieved Aug. 12, 2020).
Tamara Roth, "Neurofeedback Treatment for Addiction: Teaching the brain to self-regulate", Apr. 24, 2017, available at https://bio-medical.com/resources/neurofeedback-treatment-for-addiction-teaching-the-brain-to-self-regulate/ (retrieved Aug. 12, 2020).
Tamara Roth, "Neurofeedback treatment for addiction: Teaching the brain to self-regulate", Apr. 5, 2017, available at https://addictionblog.org/treatment/neurofeedback-treatment-for-addiction-teaching-the-brain-to-self-regulate/ (retrieved Aug. 12, 2020).
EEG Info Videos, "What is Neurofeedback?" posted Apr. 8, 2007, available at https://www.youtube.com/watch?v=t6XeCwFQrCA (retrieved Aug. 5, 2020).
"Different Types of Brain Waves: Delta, Theta, Alpha, Beta, Gamma", available at https://itsusync.com/different-types-of-brain-waves-delta-theta-alpha-beta-gamma (retrieved Aug. 5, 2020).
Je-Hyeong Bahk et al., "Flexible thermoelectric materials and device optimization for wearable energy harvesting", Journal of Materials Chemistry C, Jul. 2015.
Xiao-Rong Ding et al., "Continuous Blood Pressure Measurement From Invasive to Unobtrusive: Celebration of 200th Birth Anniversary of Carl Ludwig", IEEE Journal of Biomedical and Health Informatics, Oct. 2016.
Robert T. Thibault et al., "Neurofeedback, Self-Regulation, and Brain Imaging: Clinical Science and Fad in the Services of Mental Disorders", Psychotherapy and Psychosomatics, May 2015.
"Mini Arduino Portable EEG—Brain Wave Monitor", https://www.instructables.com/id/Mini-Arduino-Portable-EEG-Brain-Wave-Monitor-/ (retrieved Aug. 5, 2020).
"How to Hack Toy EEGs", http://www.frontiernerds.com/brain-hack (retrieved Aug. 12, 2020).
Eliza Strickland, "Wireless Earbuds Will Record Your EEG, Send Brainwave Data to Your Phone", May 17, 2016, available at https://spectrum.ieee.org/the-human-os/biomedical/devices/wireless-earbuds-will-record-your-eeg-send-brainwave-data-to-your-phone (retrieved Aug. 12, 2020).
Search Report and Written Opinion dated Dec. 14, 2020, in International Application No. PCT/US2020/043324.
International Preliminary Report on Patentability dated Sep. 17, 2021, in International Application No. PCT/US2020/043324.
Thomas Budzynski, The Clinical Guide to Sound and Light, Research Gate (2000).

(56) References Cited

OTHER PUBLICATIONS

Vincent Billock et al., Neural interactions between flicker-induced self-organized visual hallucinations and physical stimuli, PNAS 104(20), pp. 8490-8495 (May 15, 2007).
Sumit Majumder et al., Wearable Sensors for Remote Health Monitoring, Sensors 2017, 17(1), 130 (Jan. 12, 2017).
Philip Nicholson et al., Light Visions, Shaman Control Fantasies & Creation of Myths (Apr. 2006).
Philip Nicholson et al., Autohypnotic Induction of Sleep Rhythms Generates Visions of Light with Form-Constant Patterns (2014).
Mirjam Munch et al., Light and chronobiology: implications for health and disease, Dialogues in Clinical Neuroscience 14(4), pp. 448-453 (Dec. 2012).
Garen Vartanian et al., Melatonin Suppression by Light in Humans is More Sensitive Than Previously Reported, J Biol Rhythms 30(4), pp. 351-354 (Aug. 2015).
Randy Nelson et al., Dark matters: effects of light at night on metabolism, The Proceedings of the Nutrition Society 77 (3), pp. 223-229 (Aug. 2018).
Vincent Billock et al., Seeing Forbidden Colors, Scientific American 302(2), pp. 72-77 (Feb. 2010).
Lisa Ostrin et al., Attenuation of short wavelengths alters sleep and the ipRGC pupil response, Ophthalmic Physiol Opt 37(4), pp. 440-450 (Jul. 2017).
Garen Vartanian et al., Using Flickering Light to Enhance Nonnimage-Forming Visual Stimulation in Humans, Investigative Opthalmology & Visual Science 56(8), pp. 4680-4688 (Jul. 2015).
Different Types of Brain Waves: Delta, Theta, Alpha, Beta, Gamma, itsusync, https://itsusync.com/different-types-of-brain-waves-delta-theta-alpha-beta-gamma-ezp-9/, Retrieved Oct. 9, 2020.
Diana Kwon, Muscle Clocks Play a Role in Regulation Metabolism, The Scientist (Sep. 2018).
Masaaki Tanaka et al., Hazardous Effects of Light Stimulation in the Central Nervous System, Austin Journal of Clinical Neurology 1(2), pp. 1-4 (2014).
Thilo Womelsdorf et al., Theta-activity in anterior cingulate cortex predicts task rules and their adjustments following errors, PNAS 107(11), pp. 5248-5253 (Mar. 16, 2010).
Benjamin Voloh et al., Theta-gama coordination between anterior cingulate and prefrontal cortex indexes correct attention shifts, PNAS 112(27), pp. 8457-8462 (Jul. 7, 2015).
Shinheun Kim et al., Rhythmical Photic Stimulation at Alpha Frequencies Produces Antidepressant-Like Effects in a Mouse Model of Depression, PLoS ONE 11(1), e0145374 (Jan. 4, 2016).
Donald Hill et al., Sonic Patterns, Spirituality and Brain Function: The Sound Component of Neurotheology, NeuroQuantology 8(4), pp. 509-516 (Dec. 2010).
Michael Joyce MA et al., Audio-Visual Entrainment: History and Physiological Mechanisms, Journal of Neurotherapy: Investigations in Neuromodulation, Neurofeedback and Applied Neuroscience 4(2), pp. 9-25 (Oct. 17, 2008).
Stephen LaBerge, Signal-verified lucid dreaming proves that REM sleep can support reflective consciousness, International Journal of Dream Research 3(1), pp. 26-27 (2010).
Philip Merikle et al., Psychological Investigations of Unconscious Perception, Journal of Consciousness Studies 5(1), pp. 5-18 (1998).
A Vanhaudenhuyse et al., Neurophysiology of hypnosis, Neurophysiologie Clinique 44(4), pp. 343-353 (2014).
Jonathan Goldman, Sonic Entrainment (1989).
Neuroskeptic, Can You See Your Own Brain Waves, DiscoverMagazine.com (Aug. 21, 2013).
Rodika Sokoliuk et al., The Flickering Wheel Illusion: When alpha Rhythms Make a Static Wheel Flicker, Journal of Neuroscience 33(33), pp. 13498-504 (Aug. 14, 2013).

Heather Rupp et al., The Role of the Anterior Cingulate Cortex in Women's Sexual Decision Making, Neuroscience Letters 449(1), pp. 42-47 (Jan. 2009).
Stephen Laberge, Lucid Dreaming: Psychophysiological Studies of consciousness During REM sleep, Sleep and Cognition, pp. 109-126 (1990).
Lynne Levitan et al., Out-of-body experiences, dreams, and REM sleep, Sleep and Hypnosis 1(3), pp. 186-196 (1999).
Georgia Minkoff et al., Lucid Dreaming and the Prefrontal Cortex Performance III (2016).
Gilles Vandewalle et al., Blue Light Stimulates Cognitive Brain Activity in Visually Blind Individuals, Journal of Cognitive Neuroscience 25(12), pp. 2072-2085 (Dec. 2013).
Dingcai Cao et al., Estimating photoreceptor excitations from spectral outputs of a personal light exposure measurement device, Chronobiology International 32(2), pp. 270-280 (Mar. 2015).
Floor van Oosterhout et al., Ultraviolet Light Provides a Major Input to Non-Image-Forming Light Detection in Mice, Current Biology 22(15), pp. 1397-1402 (Aug. 2012).
M.S. Brown, The Measurement and Simulation of the Light of the Night Sky, Australian Dept. of Defence, Defence Science and Technology Organisation, Technical Memorandum ERL-0180-TM (Mar. 19, 1981).
Lorenzo Lazzerini Ospri et al., Mood, the Circadian System, and Melanopsin Retinal Ganglion Cells, Annual Review of Neuroscience 40(1), pp. 539-556 (Jul. 2017).
Jennifer Evans et al., Circadian Effects of Light No Brighter Than Moonlight, Journal of Biological Rhythms 22(4), pp. 356-367 (Aug. 2007).
M Boly et al., Intrinsic Brain Activity in Altered States of Consciousness, Ann. N.Y. Academy of the Sciences 1129, pp. 119-129 (2008).
Michael Chary, Psychedelic Research Finds Ego Exists in the Default Mode Network (Feb. 16, 2020).
Enzo Tagliazucchi et al., Increased Global Functional Connectivity Correlates with LSD-Induced Ego Dissolution, Current Biology 26(8), pp. 1043-1050 (Apr. 25, 2016).
Robin Carhart-Harris et al., Neural Correlates of the LSD experience revealed by multimodal neuroimaging, PNAS 113 (17), pp. 4853-4858 (Apr. 26, 2016).
Robin L. Carhart-Harris et al., Neural correlates of the psychedelic state as determined by fMRI studies with psilocybin, PNAS 109(6), pp. 2138-2143 (Feb. 7, 2012).
David Siever, Audio-Visual Entrainment: History and Physiological Mechanisms (2000).
"Transmission Curves of Optics Materials—GS Plastic Optics", https://www.gsoptics.com/transmission-curves/, retrieved on Dec. 17, 2019.
Peirson et al., "The evolution of irradiance detection: melanopsin and the non-visual opsins", Philosophical Transactions of the Royal Society B, 2009.
Do et al, "Intrinsically Photosensitive Retinal Ganglion Cells", HHS Public Access, Oct. 2010.
Berson et al., "Phototransduction by Retinal Ganglion Cells That Set the Circadian Clock", Science Mag, Feb. 8, 2002.
"Different Types of Brain Waves: Delta, Theta, Alpha, Beta, Gamma", https://itsusync.com/different-types-of-brain-waves-delta-theta-alpha-beta-gamma, retrieved on Jul. 23, 2020.
Communication pursuant to Article 94(3) EPC mailed Mar. 15, 2024, directed to EP Application No. 20 843 367.2; 4 pages.
Extended European Search Report dated Jul. 10, 2023, in EP Application No. 20843367.2.

\* cited by examiner

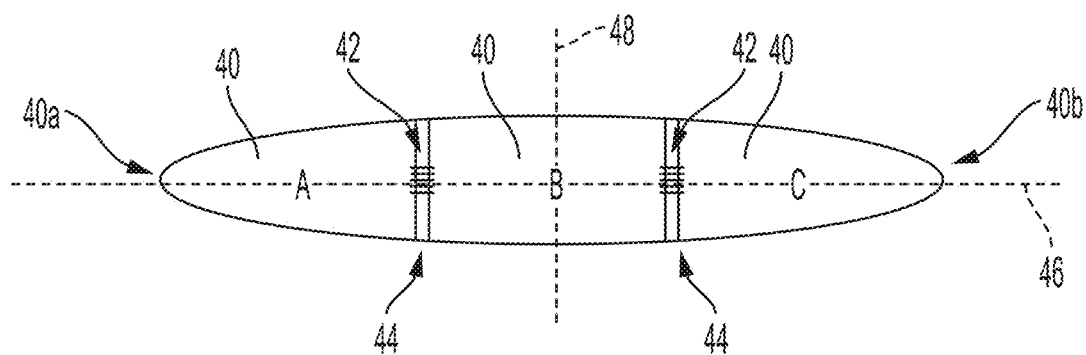
FIG. 2A
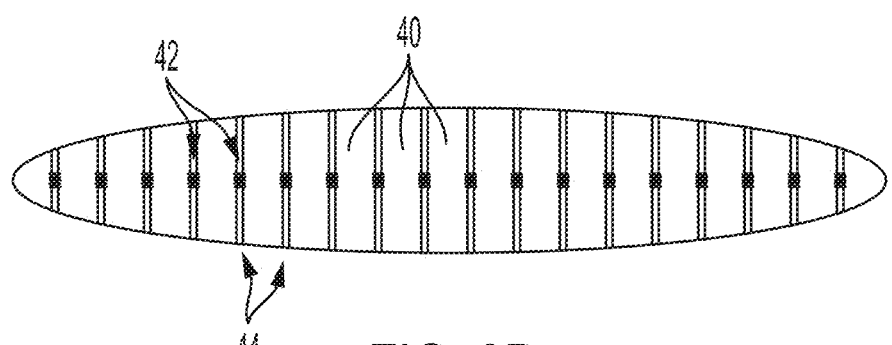
FIG. 2B
FIG. 2C
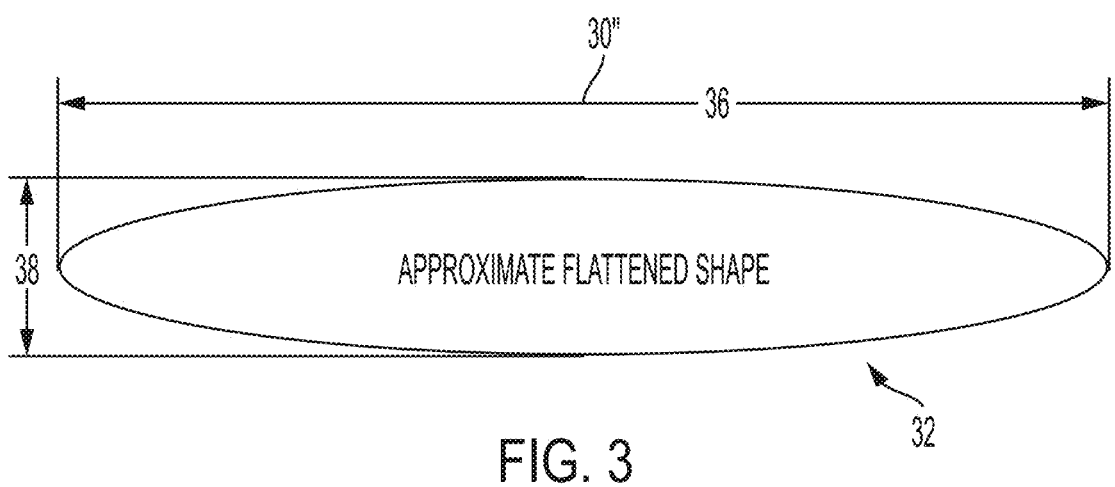
FIG. 3

SYSTEMS AND METHODS FOR USER ENTRAINMENT

CROSS-REFERENCE TO RELATED APPLICATIONS

This application claims the benefit of U.S. Provisional Patent Application No. 62/877,602, filed Jul. 23, 2019, U.S. Provisional Patent Application No. 62/961,435, filed Jan. 15, 2020, and U.S. Provisional Patent Application No. 63/049,203, filed Jul. 8, 2020, the contents of which are fully incorporated by reference herein.

TECHNICAL FIELD

The present disclosure relates to methods and systems for cognitive state and brainwave adjustment, and more specifically, to methods and systems for sensing physiological signals as biometric markers and/or altering cognitive state and/or brainwave composition. The present disclosure also relates generally to a light emitter device and system, and more specifically, to a light emitter device and system for user entrainment by applying light, sound, and/or other stimuli.

BACKGROUND

Brainwave frequencies of humans are associated with certain functions. The brainwave frequencies associated with different states may vary by user. In general, for example, gamma waves (e.g., brainwaves greater than about 40 Hz) are associated with mental activities such as perception, problem solving, and consciousness; beta waves (e.g., brainwaves between about 13-39 Hz) are associated with active mental activities such as busy thinking, active processing, active concentration, arousal, and cognition; alpha waves (e.g., brainwaves between about 7-13 Hz) are associated with calm and relaxed, but fully conscious, mental states; theta waves (e.g., brainwaves between about 4-7 Hz) are associated with deep meditation and relaxation, as well as rapid eye movement (REM) sleep; delta waves (e.g., brainwaves less than about 4 Hz) are associated with deep dreamless sleep and loss of body awareness. In addition, various stimuli, including light, sound, and tactile stimuli are known to affect cognitive states and brainwave compositions of humans.

The retina is the light sensitive portion of the eye for processing external light or photo stimuli. In general, the retina contains at least six different types of neurons: bipolar cells, retinal ganglion cells, horizontal cells, retina amacrine cells, and rod and cone photoreceptors. Light enters the retina and projects to the layer of rod and cone photoreceptors located at the inner surface of the retina. Horizontal cells help to integrate and regulate the input from the rod and cone photoreceptors. The rod and cone photoreceptors project information to ganglion cells via the intermediate bipolar cells and retina amacrine cells. Retinal ganglion cells have long axons that form the optic nerve, optic chiasm, and optic tract to transmit information from the retina to various regions of the brain including the thalamus, hypothalamus, and mesencephalon.

As described by Peirson et al., Phil. Trans. R. Soc. B (2009), "The evolution of irradiance detection: melanopsin and the non-visual opsins," the contents of which are incorporated herein by reference, the human retina contains different types of retinal ganglion cells, including intrinsically photosensitive retinal ganglion cells (ipRGCs), also called photosensitive retinal ganglion cells (pRGC) or melanopsin-containing retinal ganglion cells (mRGCs), that regulate behaviors that depend on light, but not necessarily on vision. Unlike other types of retinal ganglion cells, ipRGCs are intrinsically photosensitive due to the presence of melanopsin, a light-sensitive protein. The melanopsin of the ipRGCs is able to isomerize all-trans-retinal into 11-cis-retinal without requiring additional cell types when stimulated with light. The 11-cis-retinal isoform is more responsive to shorter wavelengths of light, while the all-trans isoform is more responsive to longer wavelengths of light. Accordingly, as described by Peirson et al., Phil. Trans. R. Soc. B (2009), "The evolution of irradiance detection: melanopsin and the non-visual opsins," in addition to the rod and cone photoreceptors described above, ipRGCs represent a third type of retinal photoreceptor. However, unlike the other photoreceptors, ipRGCs respond to light by depolarizing, thus increasing the rate at which they fire nerve impulses, which is opposite to that of other photoreceptors which hyperpolarize in response to light.

The ipRGCs are thought to have the primary role of signaling light for largely subconscious, non-image-forming visual reflexes including pupillary constriction, neuroendocrine regulation, including secretion of melatonin via the pineal gland, and synchronizing circadian physiological rhythms to the natural daily cycle of light and dark often referred to as circadian photoentrainment, as described by Peirson et al. In a healthy and normally functioning human body, a rhythmic release of melatonin is regulated by the suprachiasmatic nucleus (SCN) of the anterior hypothalamus which is ideally synchronized with the sleep-wake and daily dark-light cycles. Desynchronization or disruption of circadian rhythms, such as desynchronization of endogenous sleep-wake cycles and daytime-nighttime cycles, have been associated with a number of different adverse mental and metabolic conditions including on sleep, stress, anxiety, as well as other health conditions. As described by Do et al., Physio Rev. 2010 October; 90(4): 1547-1581, "Intrinsically Photosensitive Retinal Ganglion Cells," which is incorporated herein by reference, the ipRGCs project through the retinohypothalamic tract (RHT) to the SCN and a variety of other brain regions serving nonimage vision including the intergeniculate leaflet (EGL, a center for circadian entrainment), the olivary pretectal nucleus (OPN, a control center for the pupillary light reflex), the ventral sub-paraventricular zone (vSPZ, implicated in "negative masking" or acute arrest of locomotor activity by light in nocturnal animals), and the ventrolateral preoptic nucleus (VLPO, a control center for sleep).

Additionally, melatonin is known to play an important role in many functions of the human body, including sleep and regulation of the sleep-wake cycles. Secretion of melatonin is a signal for relaxation and lower body temperature associated with high quality sleep. In general, melatonin levels in the human body are elevated during the night, which provides a signal for the body to rest. Although, melatonin is not necessary for sleep, and no particular amount is melatonin is necessary for sleep, higher levels of melatonin secretion have been associated with higher quality and more restful sleep. In general, however, many of the specific mechanisms and responses to light are not well understood by the scientific community at large.

As described below, entrainment may refer to the capacity of the brain to naturally synchronize its brainwave frequencies with the rhythm of periodic external stimuli, such as auditory, visual, and/or tactile. As will be apparent from context, entrainment may refer to synchronization of circadian rhythm to a desired light and dark cycle.

BRIEF SUMMARY

According to an example embodiment, a system for altering the brain state of a user is disclosed. In this example embodiment, the system receives, from at least one sensor, data associated with one or more biometric markers of the user, and determines a brain state of the user based on the data associated with the one or more biometric markers of the user. The system determines a desired altered cognitive state of the user (or a desired brainwave state), and causes an emitter to apply a stimulus to the user.

According to an example embodiment, a system for entraining the user's circadian rhythms is disclosed. The system may include an emitter comprising at least one stimulus configured to be applied to the user, and a controller comprising a processor and a non-transitory computer-readable storage medium having instructions stored. When the instructions are executed, the processor may perform operations to: control a light condition to reproduce light spectra based on a predefined natural sunrise and sunset light condition, adjust spectral composition to change in time to match the predefined natural sunrise and sunset light condition, and project light at a predetermined time to stimulate the user in a way that engages their circadian biology and assists with circadian entrainment.

According to an example embodiment, a system for supporting a user's sleep is disclosed. The system may include at least one sensor configured to sense one or more biometric markers of a user, an emitter comprising at least one stimulus configured to be applied to the user, and a controller comprising a processor and a non-transitory computer-readable storage medium having instructions stored. When the instructions are executed, the processor may perform operations to: receive, from the at least one sensor, data associated with the one or more biometric markers of the user, determine a sleep state of the user based on the data associated with the one or more biometric markers of the user, determine a desired sleep state of the user, and cause the emitter to apply the stimulus to the user to reinforce or alter the user's sleep state.

According to an example embodiment, systems and methods for applying non-visual light entrainment to a subject is disclosed.

A system for stimulating a user is described, the system comprising: a light emitting device having a first light and a second light, wherein the first light is configured to emit a first wavelength of light, wherein the second light is configured to emit a second wavelength of light; and a controller for controlling the first light and the second light, wherein the first light is controlled to oscillate the first wavelength of light within a first range of entrainment frequencies, wherein the second light is controlled to oscillate the second wavelength of light within a second range of entrainment frequencies.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media as a technical solution to the technical problem described.

BRIEF DESCRIPTION OF DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 2A illustrates an exemplary circuit board arrangement for a light emitter in a flattened view, according to an embodiment, FIG. 2B illustrates an exemplary circuit board arrangement for a light emitter in a flattened view, according to an embodiment, and FIG. 2C illustrates a side view of three adjacent lighting units, according to an embodiment.

FIG. 3 illustrates an exemplary diffuser screen for a light emitter in a flattened view, according to an embodiment.

DETAILED DESCRIPTION

The present disclosure relates to systems and methods for dosing light and/or other stimulus, including to a subject, and to entraining a subject. For explanatory purposes, a system and method that applies a light stimulus to a subject will be primarily described. Example devices for applying a light as a stimulus are described in U.S. Provisional Patent Application No. 62/877,602, filed Jul. 23, 2019, U.S. Provisional Patent Application No. 62/961,435, filed Jan. 15, 2020, and U.S. Provisional Application No. 63/049,203, filed Jul. 8, 2020, each of which are hereby incorporated by reference in their entireties. Various embodiments of the disclosure are described in detail below. While specific example implementations are described, it should be understood that this is done for illustration purposes only. Other components and configurations may be used without departing from the spirit and scope of the disclosure.

Figure 1:
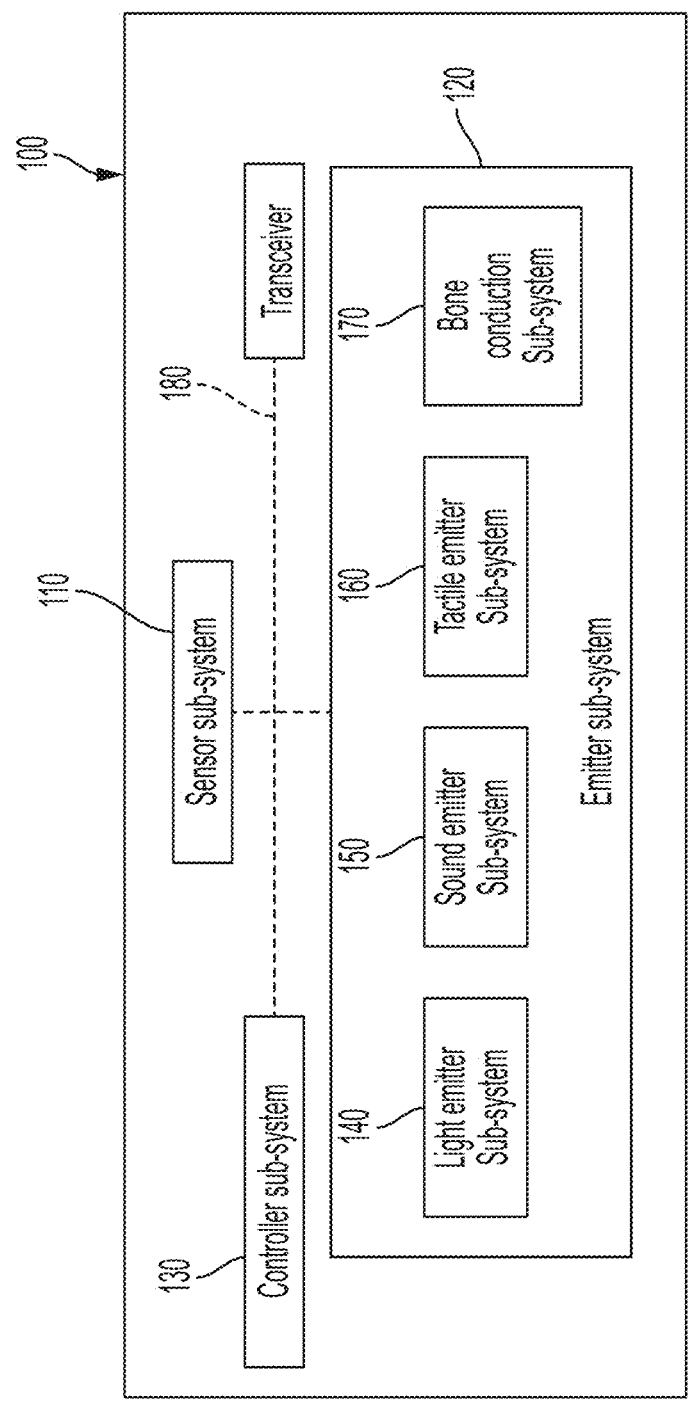
FIG. 1 illustrates a system, according to an embodiment.

FIG. 1 illustrates a system 100 according to an example embodiment. In one embodiment, the system 100 is configured to emit a light stimulus to a user. According to an embodiment, the system 100 may include a sensor sub-system 110, an emitter sub-system 120, and a controller sub-system 130. As explained in more detail below, the system 100 may be configured to determine different inputs from the sensor sub-system 110, including characteristics sensed from the user's body and/or the user's environment, in order to apply light or other stimulus to the user via the emitter sub-system 120, based on control by the controller sub-system 130.

The sensor sub-system 110 may include one or more sensors for sensing and/or recording biometric information of a user, such as one or more markers of a user's parasympathetic nervous system. In general, biometric markers of the parasympathetic nervous system may include, for example, heart rate, heart rate variability, rate of blood flow, blood pressure, body temperature, electrodermal activity (e.g., galvanic skin response), and/or other one or more biometric markers.

The emitter sub-system 120 may include one or more stimulus emitters. For example, the emitter sub-system 120 may emit a visual, auditory, or tactile stimulus, or any combination thereof, to a user, as explained in detail below. In one embodiment, the emitter sub-system 120 may be configured to apply a predetermined amount of light to the user in order to apply light to stimulate the user's retinal ganglion cells, such as for entrainment of a user's brainwave to a frequency and/or photic entrainment of the circadian rhythm. The predetermined amount of light, for example, may include a predetermined intensity or amplitude of one or more wavelengths of light applied a predetermined entrainment frequency or pulse rate (Hz). As described in more detail below, the light may be applied to stimulate the user's central nervous system and metabolic systems and produce a desired brainwave state in the user. According to an embodiment, sound emitter sub-system 140, the tactile emitter sub-system 160, and/or the bone conduction sub-system 170 may be similarly configured to emit their respective stimulus at predetermined intensity or amplitude applied a predetermined entrainment frequency or pulse rate (Hz).

The controller sub-system 130 may receive the data collected from the sensors of the sensor sub-system 110, and process the sensor data to determine or predict the user's cognitive state and/or brainwave composition. For example, the controller sub-system 130 may determine or predict the user's cognitive state and/or brainwave composition without actually directly measuring the user's brainwaves. The controller sub-system 130 may, based on the determined or predicted cognitive state or brainwave composition, determine one or more stimuli to apply to the user to alter the user's cognitive state and/or brainwave composition. The controller sub-system 130 may then control the emitter sub-system 120 to apply the determined stimuli to the user.

According to an embodiment, the controller sub-system 130 may determine a sleep state of the user based on data associated with the one or more biometric markers of the user from the sensor sub-system 110. The controller sub-system 130 may determine a desired sleep state of the user based on, for example, empirical data from other users or from historical data of the user, and may cause the emitter sub-system 120 to apply a stimulus to the user to reinforce or alter the user's sleep state.

The sensor sub-system 110, the emitter sub-system 120, and the controller sub-system 130 may communicate with each other over one or more data links 180, which may include a wired or wireless link. For instance, in an embodiment where the sensor sub-system 110, the emitter sub-system 120, and the controller sub-system 130 are integrated into a single device, the data link 180 may include a circuit path along a printed circuit board (PCB) on which the sensor sub-system and the controller sub-system 130 are both connected. In an embodiment where the sensor sub-system 110, the emitter sub-system 120, and the controller sub-system 130 are implemented as two or more separate, discrete devices, the data link 180 may include a wired connection (e.g., USB, etc.) or a wireless connection based on an established protocol (e.g., Bluetooth, WiFi, NFC, etc.) or another protocol, such as a proprietary protocol.

Sensor Sub-System

According to an embodiment, the sensor sub-system 110 may sense and track biometric data related to emotional, behavioral, cognitive, and/or sleep quality or function of the user. For example, the sensor sub-system 110 may detect an elevated stress level of the user based on sensed biometric data from the sensor sub-system 110. As another example, the sensor sub-system 110 may determine that the user is in a state of anxiety or depression based on sensed biometric data from the sensor sub-system 110. As another example, the sensor sub-system 110 may determine that the user is in a state of fatigue based on sensed biometric data from the sensor sub-system 110. As another example, the sensor sub-system 110 may determine the circadian phase or the extent of circadian synchrony (or lack thereof, as in jetlag or other disrupted states) of the user.

According to an embodiment, the sensor sub-system 110 may include one or more sensors configured to detect a biometric marker related to the parasympathetic nervous system. For example, the sensor sub-system 110 may include one or more sensors, such as, but not limited to, a galvanic sensor, an infrared sensor, a photoplethysmographic sensor, a heart rate sensor, a temperature sensor, other types of sensors, and/or combinations thereof to detect markers for the parasympathetic nervous system.

Emitter Sub-System—Visual Stimulus

According to an embodiment, the emitter sub-system 120 may include a light emitter sub-system 140 having one or more lights to emit light-based stimulus to the user. The one or more lights may be, for example, a micro-light emitting diode (micro-LED) or LED configured to emit light at a predetermined frequency and brightness (e.g. photo-stimulation) according to the controller sub-system 130 and explained in further detail below. For example, the one or more lights may provide a visual stimulus (for example, photo-stimulation) to the user when the light emitter sub-system 140 is moved to a location adjacent to the user's face and eyes.

According to an embodiment, the one or more lights of the light emitter sub-system 140 may emit light in the same direction as the one or more sensors of the sensor sub-system 110. According to an embodiment, the one or more lights of the light emitter sub-system 140 may emit light in a different direction than the one or more sensors of the sensor sub-system 110, such as, for example, in a second direction orthogonal to the first direction of the one or more sensors of the sensor sub-system 110. For example, the one or more lights of the light emitter sub-system 140 may directionally emit light towards the eyes of the user when the system 100 is placed at a location adjacent to the user's face. In an embodiment, all of the lights are identical. In another embodiment, one or more of the lights differs from the remaining lights, such as in emission color spectrum, maximum or minimum intensity, or other characteristics.

According to an embodiment, the light emitter sub-system 140 may be provided as a standalone system and controlled by the controller sub-system 130.

According to an embodiment, the light emitter sub-system 140 may be configured to emit light towards a user. As explained in more detail below, the light emitter sub-system 140 may be embodied in different forms to apply light to the user. For example, the light emitter sub-system 140 may be configured with one or more lights and controlled by controller sub-system 130 to emit one or more wavelengths of light at a predetermined pulse rate or entrainment frequency. The one or more wavelengths of light may be within the human visual spectrum of light and/or outside the human visual spectrum of light. In order to entrain a user to a desired brainwave state, the pulse rate or entrainment frequency of the one or more lights may correspond to one or more of the brainwave frequencies described above. For example, in order to entrain a user to a theta state, the one or more lights may be pulsed at a rate between 4 Hz to 7 Hz for a predetermined amount of time.

Conventionally, for example, light sources were removed in order to signal a human body to relax and/or prepare for sleep, such as by increasing secretion of melatonin. In contrast, the inventors have discovered that the application of light to the human eye, as disclosed herein, improves sleep quality and mood in humans. As described above, ipRGCs are receptive to light and impact neuroendocrine regulation and synchronization of circadian physiological rhythms, among other physiological functions. As described below, the methods and system are configured to stimulate a physiological response in the user, such as via the retina and ipRGCs.

As known to one of ordinary skill in the art, the visible light spectrum to a typical human eye has a range of wavelengths of about 380 nanometers to about 740 nanometers (or a frequency range of about 430 THz to about 770 THz). Ultra-violet (UV) light is non-visible light to a typical human eye and has a range of wavelengths of about 10 nanometers to less than about 400 nanometers (or a frequency range of about 30 PHz to about 750 THz). Infrared (IR) light is also non-visible light to a typical human eye with a range of wavelengths greater than about 700 nanometers to about $10^6$ nanometers (or a frequency range of about 430 PHz to about 300 GHz).

According to an embodiment, the non-visual light spectrum, such as UV and IR light, is applied to a user in order to stimulate ipRGCs. The inventors have discovered that this light stimulation is effective for entrainment or increasing the likelihood of theta and/or delta brainwaves, such as, for example, to promote specific physiological responses (e.g., restful sleep, increased cognitive ability, etc.).

According to an embodiment, the predetermined amount of light, whether from the visual spectrum or the non-visual spectrum of wavelengths of light, emitted from the light emitter sub-system 140 may be controlled to a threshold and dynamic range of light response in the ipRGCs, as described by Berson et al., "*Phototransduction by Retinal Ganglion Cells That Set the Circadian Clock*," Vol. 295 SCIENCE (www.sciencemag.org), which is incorporated herein by reference. For example, the light emitter sub-system 140 may be controlled to emit specific wavelengths of light (and oscillations thereof, as described below) to a predetermined amount of a retinal irradiance range. According to an embodiment, the light may be controlled to levels that are only perceived by the ipRGCs in order to stimulate the SCM. This light can be within the visual spectrum of light but controlled to levels that are otherwise imperceptible or not visible to a user. As shown in Table 1, for example, various wavelengths of light may be controlled to within ranges of retinal irradiance in order to regulate and/or stimulate the ipRGCs.

TABLE 1

| Wavelength (nm) | Retinal irradiance (photons s$^{-1}$ cm$^{-2}$) |
| --- | --- |
| 365-400 | $10^{14.0}$ |
| 400-460 | $10^{13.5}$ |
| 460-500 | $10^{13.4}$ |
| 500-520 | $10^{12.8}$ |
| 520-570 | $10^{13.7}$ |
| 570-600 | $10^{14.2}$ |
| 600-760 | $10^{15.8}$ |

Emitter Sub-System—Auditory Stimulus

According to an embodiment, the emitter sub-system 120 may include a sound emitter sub-system 150 having one or more speakers 152 to emit sound-based stimulus to the user. The one or more speakers 152 may be configured to emit sound at a predetermined frequency and volume (e.g., auditory stimulation) according to the controller sub-system 130 and explained in further detail below. For example, the one or more speakers 152 may provide auditory-stimulation to the user when the emitter sub-system 120 is moved to a location adjacent to the user's face.

According to an embodiment, the one or more speakers 152 may emit sound in the same direction as the one or more sensors of the sensor sub-system 110. According to an embodiment, the one or more speakers 152 may emit sound in a different direction than the one or more sensors of the sensor sub-system 110, such as, for example, in a second direction orthogonal to the first direction of the one or more sensors of the sensor sub-system 110. According to an embodiment, the one or more speakers 152 of the sound emitter sub-system 150 may emit sound in a different direction than the one or more lights of the light emitter sub-system 140, such as, for example, in a third direction at an angle to the second direction of the one or more lights. For example, the one or more speakers 152 of the sound emitter sub-system 150 may directionally emit sound towards the ears of the user, while the one or more lights of the light emitter sub-system 140 may directionally emit light towards the eyes of the user, when the system 100 is placed at a location adjacent to the user's face.

According to an embodiment, the sound emitter sub-system 150 may be provided as a standalone system and controlled by the controller sub-system 130. For example, the sound emitter sub-system 150 may include headphones, earbuds, and or a speaker for emitting the sound to directly to one user or to a plurality of users.

Emitter Sub-System—Tactile Stimulus

According to an embodiment, the emitter sub-system 120 may include a tactile emitter sub-system 160 having one or more motors to emit tactile or haptic-based stimulus to the body or hands of a user. The one or more motors may be, for example, but not limited to, an eccentric rotating motor (ERM) or a linear resonant actuator (LRA) configured to emit vibration at a predetermined frequency and strength according to the controller sub-system 130 and explained in further detail below. For example, the one or more motors may provide tactile stimulation to the user with the tactile emitter sub-system 160.

According to an embodiment, the one or more motors of the tactile emitter sub-system 160 may emit vibration in the same direction as the one or more sensors of the sensor sub-system 110. According to an embodiment, the one or more motors of the tactile emitter sub-system 160 may emit vibration in a different direction than the one or more sensors of the sensor sub-system 110, such as, for example, in a second direction orthogonal to the first direction of the one or more sensors of the sensor sub-system 110. According to an embodiment, the one or more motors of the tactile emitter sub-system 160 may emit vibration in a different direction than the one or more lights of the light emitter sub-system 140, such as, for example, in a fourth direction at an angle to the second direction of the one or more lights. For example, the one or more motors of the tactile emitter sub-system 160 may directionally emit vibration towards the face of the user, while the one or more speakers of the sound emitter sub-system 150 may directionally emit sound towards the ears of the user, while the one or more lights of the light emitter sub-system 140 may directionally emit light towards the eyes of the user, when the system 100 is placed at a location on the user's face.

According to an embodiment, the tactile emitter sub-system 160 may be provided as a standalone system and controlled by the controller sub-system 130.

According to an embodiment, piezoelectric transducers may be used to apply tactile stimuli to the user.

Emitter System—Bone Conduction (Combination Auditory/Tactile Stimulus)

According to an embodiment, the emitter sub-system 120 may include a bone conduction sub-system 170 having one or more motors to emit vibration-based stimulus to the user via the jawbone or cheekbone of the user. The vibration-based stimulus applied to the jawbone or cheekbone of the user are received by the cochlea and perceived by the user as sound. The one or more motors may be, for example, but not limited to, an eccentric rotating motor (ERM) or a linear resonant actuator (LRA) configured to emit vibration, and perceived sound, at a predetermined frequency and strength according to the controller sub-system 130 and explained in further detail below. For example, the one or more motors may provide auditory-stimulation and tactile-stimulation to the user when the bone conduction sub-system 170 is moved into contact with the user's face, such as on the jawbone or cheekbone.

According to an embodiment, the one or more motors of the bone conduction sub-system 170 may emit vibration in the same direction as the one or more sensors of the sensor sub-system 110. According to an embodiment, the one or more motors of the bone conduction sub-system 170 may emit vibration in a different direction than the one or more sensors of the sensor sub-system 110, such as, for example, in a second direction orthogonal to the first direction of the one or more sensors of the sensor sub-system 110. According to an embodiment, the one or more motors of the bone conduction sub-system 170 may emit vibration in a different direction than the one or more lights of the light emitter sub-system 140, such as, for example, in a fourth direction at an angle to the second direction of the one or more lights. For example, the one or more motors of the bone conduction sub-system 170 may directionally emit vibration on the face of the user, while the one or more speakers of the sound emitter sub-system 150 may directionally emit sound towards the ears of the user, while the one or more lights of the light emitter sub-system 140 may directionally emit light towards the eyes of the user, when the system 100 is placed at a location on the user's face.

According to an embodiment, the bone conduction sub-system 170 may be provided as a standalone system and controlled by the controller sub-system 130.

Controller Sub-System

According to an embodiment, the controller sub-system 130 may be configured to receive data, such as biometric marker data relating to the user's parasympathetic nervous system, sensed by the sensor sub-system 110. According to an embodiment, the controller sub-system 130 may utilize a general-purpose computing device 400, as explained in more detail below.

According to an embodiment, the controller sub-system 130 may be configured to receive data, such as biometric marker data relating to the user's parasympathetic nervous system, sensed by the sensor system 110, in order to determine or predict the user's cognitive state and/or brainwave composition. According to an embodiment, the user's brainwave composition is determined or predicted.

According to an embodiment, the user's brainwave composition is determined or predicted without directly measuring the user's brainwaves.

According to an embodiment, the user's biometric data is processed in real time by the general-purpose computing device 400.

According to an embodiment, the general-purpose computing device 400 contains algorithms that predict cognitive states/brainwave composition based upon the user's biometric data. For example, the controller sub-system 130 may use a set of stored data of empirical testing of users in different known cognitive states and/or brainwave compositions. The controller sub-system 130 may compare the user's biometric data to the set of stored data to predict the current cognitive state and/or brainwave composition of the user. For example, changes in brainwaves may be associated with changes in heart rate, heart rate variability, or galvanic skin response. The data sensed from the biosensors may detect changes in these or other relevant biological outputs to predict the current cognitive state and/or brainwave composition of the user.

According to an embodiment, the controller sub-system 130 may be configured to determine a desired cognitive state or brainwave state of the user. For example, the controller sub-system 130 may use a set of stored data of empirical testing of users to determine likely desired cognitive states and/or brainwave compositions. The controller sub-system 130 may compare the user's biometric data to the set of stored data to predict the user's desired cognitive state and/or brainwave composition. According to an embodiment, the controller sub-system 130 may receive a user selection to select a desired cognitive state or brainwave state of the user.

According to an embodiment, the controller sub-system 130 may be configured to control the emitter sub-system 120 based on the data sensed by the sensor sub-system 110.

According to an embodiment, the controller sub-system 130 may be configured to control the emitter sub-system 120 based on a predefined natural sunrise and sunset light conditions. For example, natural sunrise and sunset light conditions may be measured according to a user's location or desired location. Such conditions may be measured light spectra over time of a natural sunrise and natural sunset. The controller sub-system 130 may be loaded with the measurements as a predefined light spectra of the natural sunrise and natural sunset. The controller sub-system 130 may be configured to adjust and project the spectral composition of the light emitter sub-system 140 to match or emulate the predefined light spectra of the natural sunrise and natural sunset when in use. The controller sub-system 130 may be further configured to notify the user to use the device at a predetermined time in order to stimulate the user in a way that engages their circadian biology and assists with circadian entrainment, as explained above.

According to an embodiment, the light emitter sub-system 140, and/or the sound emitter sub-system 150, and/or the tactile emitter sub-system 160, and/or the bone conduction sub-system, can deliver rhythmic stimuli with properties specified by the controller sub-system 130 when the user's biometric data provided by the sensor sub-system 110 indicate an undesired state. These rhythmic neurological stimuli are configured and synchronized to algorithmically influence the user's endogenous brainwave composition and associated cognitive states.

According to an embodiment, the controller sub-system 130 may be configured to control one or more of the light emitter sub-system 140, sound emitter sub-system 150, tactile emitter sub-system 160, and/or bone conduction sub-system 170 to increase probability of altering the cognitive state or brainwaves of a user. For example, the controller sub-system 130 may be configured to simultaneously control the light emitter sub-system 140 and sound emitter sub-system 150 or bone conduction system 170 to provide a neurological stimulus.

Light Emitter & Diffuser

Various aspects of the light emitter sub-system 140 will now be discussed with respect to FIGS. 2A-2C and 3. In one embodiment, the light emitter sub-system 140 includes a light emitter 16 and a diffuser screen 32. The light emitter 16 may be formed of one or more lighting units 40, each lighting unit 40 including a substrate (e.g., printed circuit board (PCB)) and one or more light emitters mounted on the substrate. The diffuser screen 32 is overlaid on the light emitter and diffuses light emitted therefrom.

The diffuser screen 32 may be formed of diffuser material. The diffuser screen 32 may cover or be overlaid onto one or more printed circuit boards (PCBs). According to an embodiment, a small PCB may be formed from a larger standard PCB panel. For example, standard PCB panels vary in size, but the most common panel size is about 18 inches by about 24 inches. The panel size may limit or dictate the largest possible PCB that may be formed.

Referring to FIGS. 2A-2C, examples of arrangements of one or more PCBs to be used with the diffuser screen 32 and light emitter 16 are shown. In the examples of FIGS. 2A and 2B, the PCBs may be formed of the units 40. Each individual lighting unit 40 includes an individual PCB and may be shaped and arranged as a narrow vertical strip. The lighting units 40 may be coupled or tied together electrically using couplings 42. For example, in FIG. 2A, the light emitter 16 may include three lighting units 40 (e.g., three PCBs) with couplings 42 electrically coupling or tying together each adjacent two lighting units 40. The diffuser screen 32 may be overlaid on the lighting units 40 and both the lighting units 40 and the diffuser screen 32 may be housed in a housing of light emitter 16. The lighting units 40 may be small enough to be manufactured by a standard or conventional process. An air gap 44 may exist between sides of the lighting units 40. The width of the air gap 44 (e.g., the distance between sides of the lighting units) may be relatively small. For example, the air gap 44 may be in the range of about 0.04 inches (about 0.10 cm) or less. The air gap 44, for example, may dissipate heat from the lighting units 40 and alleviate heating of the diffuser screen 32. More or fewer than three lighting units 40 may be provided. For example, in FIG. 2B, the diffuser screen 32 and light emitter 16 may include nineteen lighting units 40. And FIG. 2C illustrates a side view of an example embodiment that includes three lighting units 40.

The lighting units 40 may be sized and dimensioned such that, collectively, the lighting units 40 form generally an elongated oval or elliptical shape. In an example, the centermost lighting unit 40 may have the greatest height. The height of the lighting units 40 may gradually decrease from the centermost lighting unit 40 toward each of a first end 40a and a second end 40b of the arrangement of lighting units 40. The lighting units 40 may have curved upper and lower surfaces. The lighting units 40 may be substantially straight lateral sides. The lighting units 40 at the ends 40a, 40b may be curved such that are substantially semi-circular in plan view. Alternatively, the lighting units 40 may collectively form a circular shape, a rectangular shape, or any other shape for emitting a desired profile of light.

The lighting units 40 may be curved. Each lighting unit 40 may curve from top to bottom (e.g., about a horizontal axis 46). Each lighting unit 40 may also (or alternatively) curve from side to side (e.g., about a vertical axis 48). Each lighting unit 40 may have a different amount of curvature about the axis 48. In an example, each lighting unit 40 may bend from top to bottom and adjacent lighting units 40 may have a different amount of curvature. In this example, the diffuser screen 32 may curve about both the vertical and horizontal axis. Although PCBs may allow for bending only in a single axis, providing the light emitter 16 with many vertical strips may simulate bending in two axes.

Figure 4B:
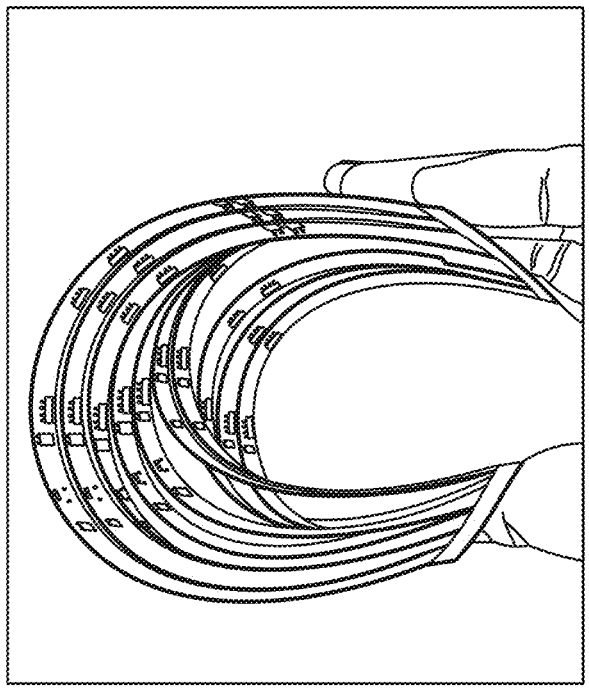
FIGS. 4A and 4B illustrate an exemplary printed circuit board, according to an embodiment.
Figure 4A:
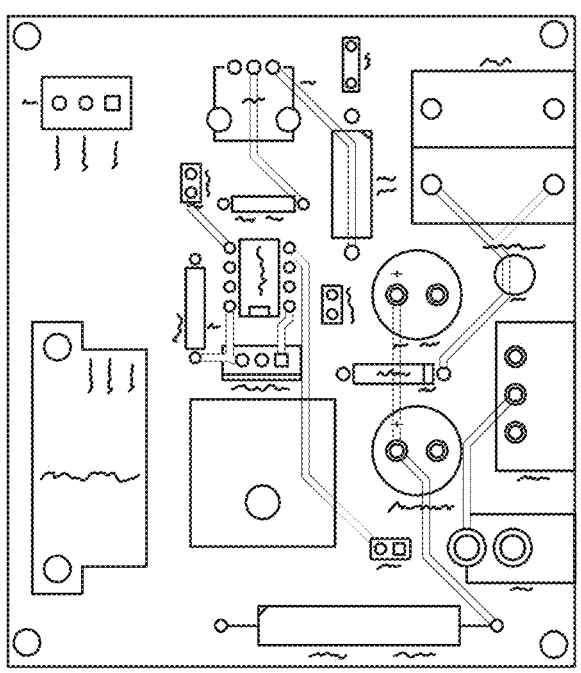

Referring to FIGS. 4A and 4B, the lighting units 40 may be formed of standard PCB material. According to an embodiment, the lighting units 40 may be formed of a glass-reinforced epoxy laminate material such as, for example, FR4. FR4 is a fiberglass substrate coated with copper, a solder mask (usually green, but may be any color), and printed "silk screen" lettering. FR4 can be turned into PCBs ranging in thickness from 0.02" to 0.12". Since FR4 is made of fiberglass, FR4 is rigid but can still achieve gentle bends, especially if thinner FR4 is used. To provide a diffuser screen 32 with a bend radius of about 6 inches, the lighting units 40 used with the diffuser screen 32 may be formed of FR4 having a thickness of about 0.02 inches (0.05 cm). FR4 is only flexible in one dimension, (e.g., FR4 may bend, but it may not cup). That is, as shown in FIG. 4B, FR4 may bend about the axis 46 (FIG. 2A), but not about the axis 48 (FIG. 2A). To create the bend about axis 48, each lighting unit 40 may be placed in the light emitter 16 at a different radius of curvature.

Figure 4C:
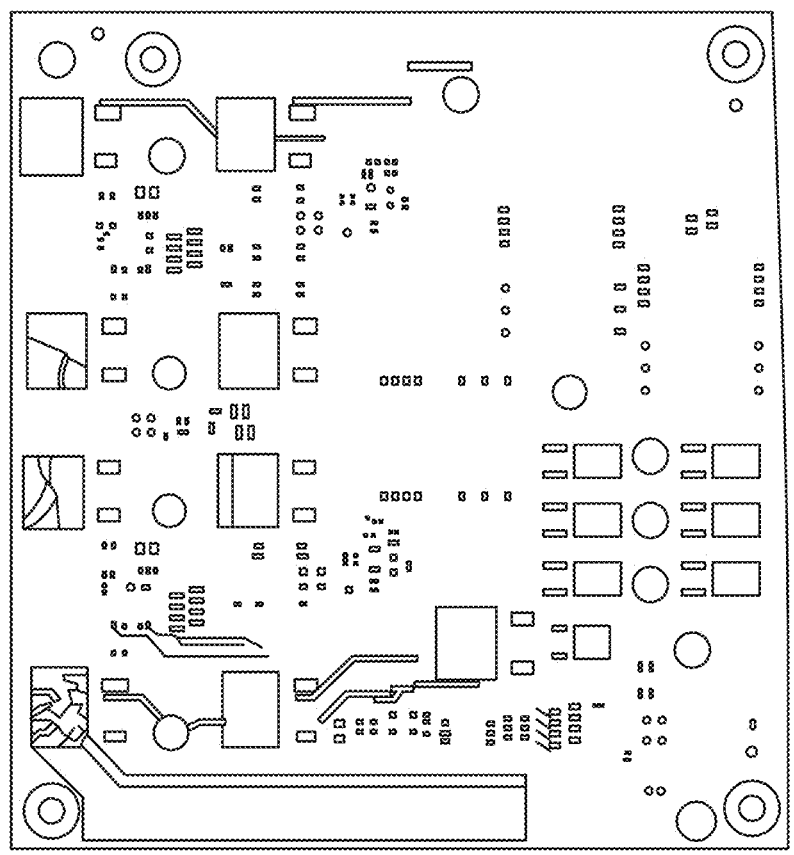
FIG. 4C illustrates an exemplary printed circuit board, according to an embodiment.

Referring to FIG. 4C, the lighting units 40 may be formed of aluminum. For example, the lighting units 40 may be formed of thin sheets of aluminum. Aluminum is a good thermal conductor and may be helpful in managing thermal loads. Similar to FR4, aluminum PCBs are only flexible in one dimension, that is, an aluminum PCB may slightly bend but may not "cup." To create the bend about two axes, the aluminum PCB may be arranged in a manner similar to the FR4, and as described with respect to FIGS. 2A-2C, to be used with the diffuser screen 32.

Figure 4D:
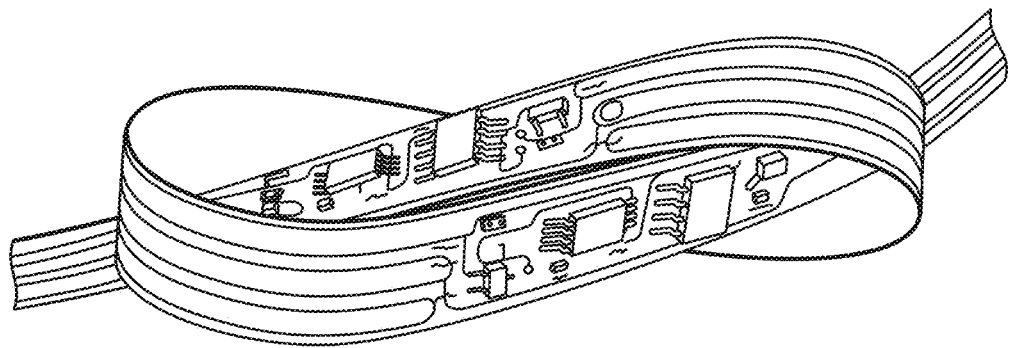
FIG. 4D illustrates an exemplary printed circuit board, according to an embodiment.

Referring to FIG. 4D, the lighting units 40 may be formed of flexible printed circuits (FPC). FPCs may be used when very tight bend radii (less than about 1 inch) are required. FPC may be either aramid fiber, polyethylene terephthalate, polyimide, or polyvinyl chloride as a substrate. The feeling of an FPC is similar to classic 35 mm celluloid camera film. FPCs are more delicate than other PCBs, require special manufacturing techniques, and are more costly (although, the PCB itself may be about <5% of the overall assembled PCB or assembled product cost). FPCs are only flexible in one dimension, meaning it can bend but it cannot "cup." To create the bend about two axes, the FPC may be arranged in a manner similar to the FR4, and as described with respect to FIGS. 2A-2C, to be used with the diffuser screen 32.

Figure 5A:
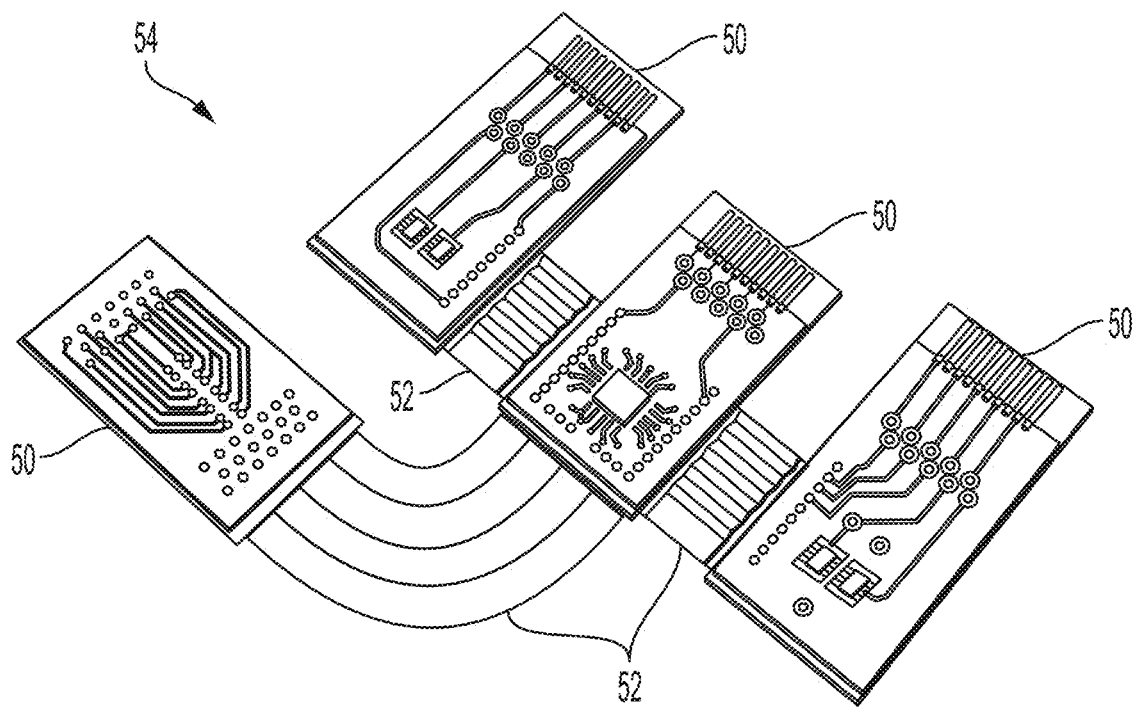
FIGS. 5A and 5B illustrate an exemplary printed circuit board, according to an embodiment.
Figure 5B:
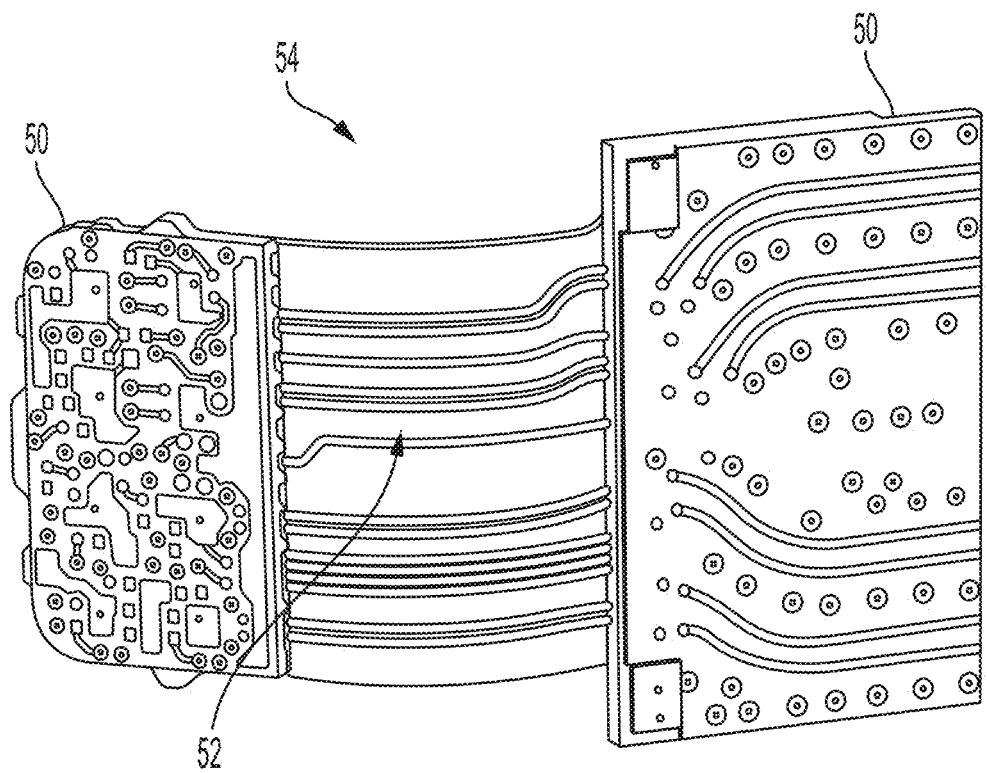

Referring to FIGS. 5A and 5B, the lighting units 40 may be formed of a combination of FR4 50 and FPC 52 into a hybrid rigid flex PCB 54. This configuration may be used when only a small area of the entire PCB needs to be flexible. Each FPC 52 may form a bridge. The FPC bridge may be flexible in only one dimension, so each bridge may bend but may not "cup." Multiple bridges may be used to create a kind of cupping effect if some bridges bend in one axis and other bend on another axis. With this technique, the lighting units 40 of FIGS. 5A and 5B may be used to bend about two axes and accommodate the shape of the diffuser screen 32.

Figure 6:
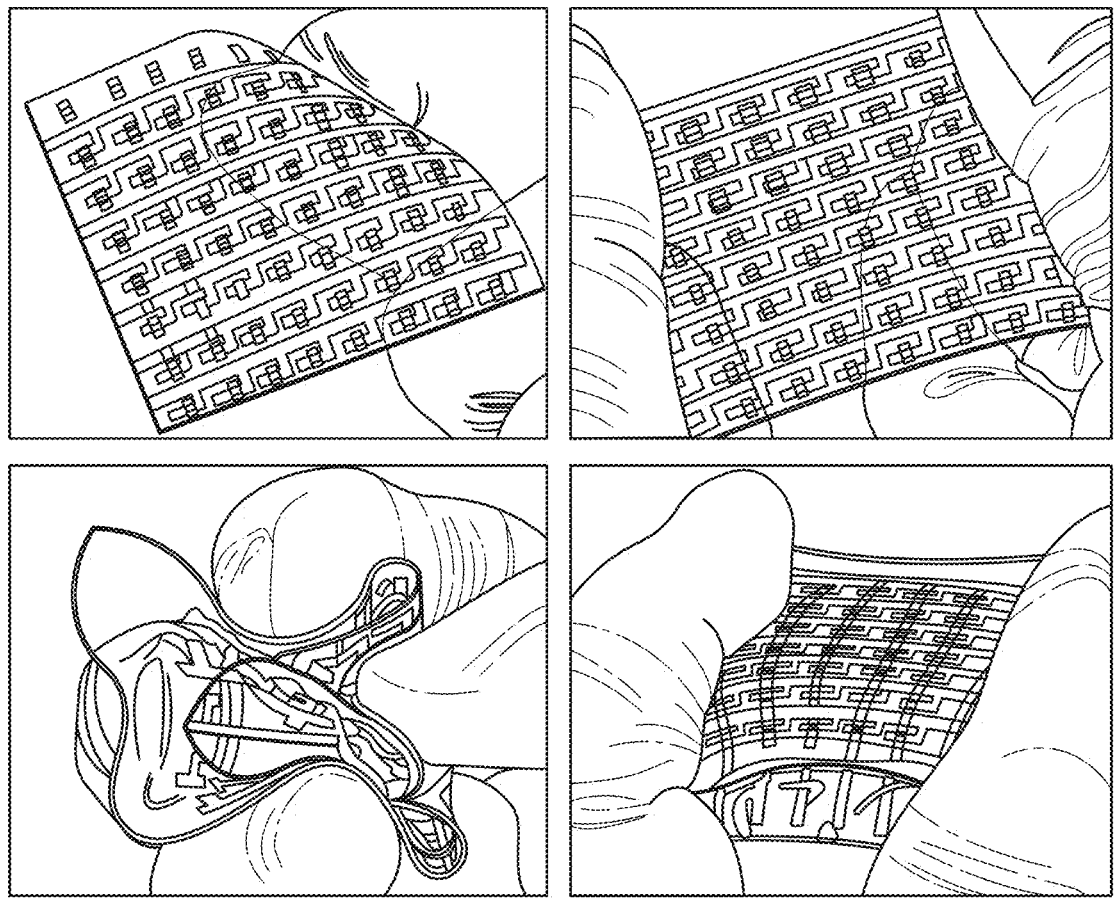
FIG. 6 illustrates exemplary flexible electronics, according to an embodiment.

Referring to FIG. 6, the lighting units 40 may be formed of stretchable electronics. Stretchable electronics may bend and stretch in many axes. One or more stretchable electronics may be used with the diffuser screen 32.

Although any of the examples described in FIGS. 4A-4D, 5, and 6 may be used with the diffuser screen 32, or alternatives not mentioned herein, the diffuser screen 32 may be formed of a thin FR4 PCB.

The light emitter 16 may have spatial control (e.g., spatially controlled zones) for controlling the stimulus provided to the subject. For example, the spatial control may be light controlled zones. According to an embodiment, the light emitter 16 may be have zones that may be separately and/or selectively controlled. For example, one or more control zones may be an area of a predetermined color and/or flicker behavior, such as a constant or variable color and/or flicker behavior. According to an embodiment, the color and/or flicker may be controlled selectively, separately, and/or individually for each zone. According to an embodiment, the zones may be physically separated but may be controlled as a single zone. According to an embodiment, the light emitter 16 may have one or more light emitting diodes (LEDs) in each of the one or more zones.

The spatial control strategy for the light emitter 16 may depend on how many unique spatial control zones are required or desired. These light control zones may or may not correspond to individual PCBs. For example, where more than one PCB is employed in light emitter 16, a control zone may span multiple PCBs, or may alternatively correspond to each individual PCB. Increasing the number of control zones may increase the complexity of creating animations or predetermined light stimulus for the light emitter 16. Complete control of a single-zone diffuser screen may require tuning of 64 unique parameters. Complete control of a quad-zone diffuser screen may require tuning of 256 parameters. Complete control of a multi-zone (e.g., more zones than a quad-zone) diffuser screen 32 may require tuning of thousands of parameters. Zone control might require the use of a tool like video editing software in addition to music production software.

Figure 7A:
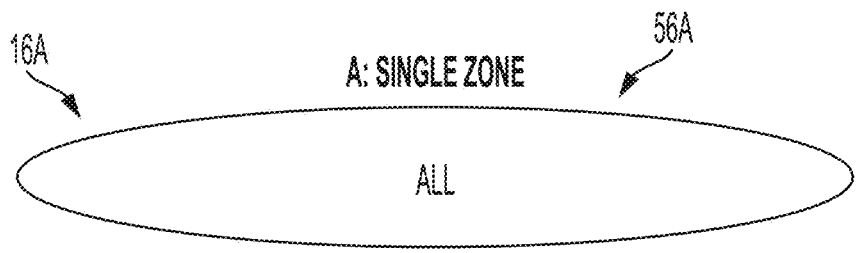
FIGS. 7A-7G illustrate exemplary control zones of a light emitter, according to an embodiment.

Referring to FIGS. 7A-7G, exemplary control zones for the light emitter 16 are shown. In FIG. 7A, a light emitter 16A may have a single control zone 56A. The single control zone 56A may include the peripheral, foveal, and left and right zones. According to an embodiment, a peripheral zone may be completely outside the line of sight of a user. According to an embodiment, a foveal zone may be completely with the line of sight of a user. According to an embodiment, a zone may overlap the peripheral zone and the foveal zone.

Figure 7B:
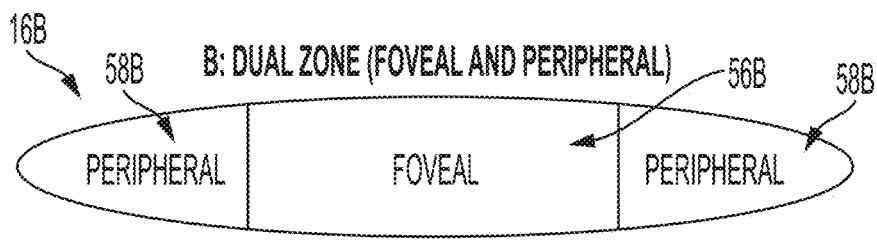

In FIG. 7B, an exemplary light emitter 16B may have dual control zones. The light emitter 16B may have a foveal control zone 56B and a peripheral control zone 58B. The peripheral zones 58B, although separated, may be controlled as a single zone. That is, the left and right peripheral control zones may be controlled together and may thus behave identically.

Figure 7C:
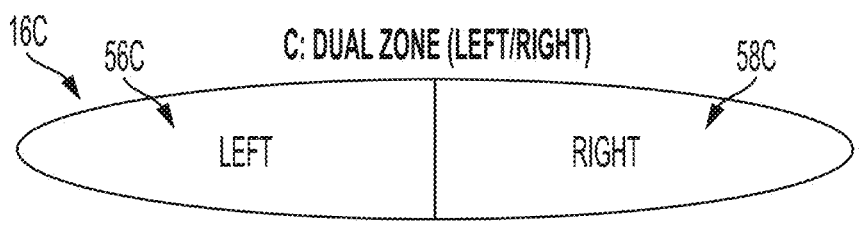

In FIG. 7C, an exemplary light emitter 16C may have dual control zones. The light emitter 16C may have a left control zone 56C and a right control zone 58C.

Figure 7D:
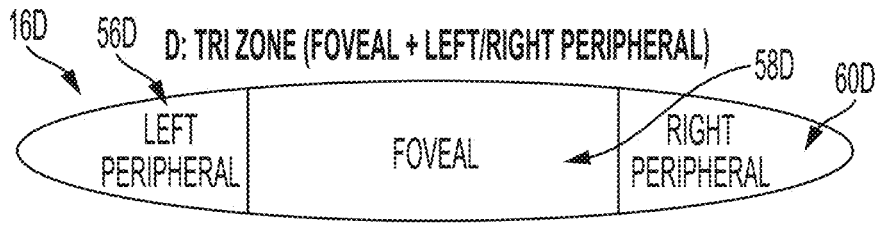

In FIG. 7D, an exemplary light emitter 16D may have tri-control zones. The light emitter 16D may have a left peripheral control zone 56D, a foveal control zone 58D, and a right peripheral control zone 60D.

Figure 7E:
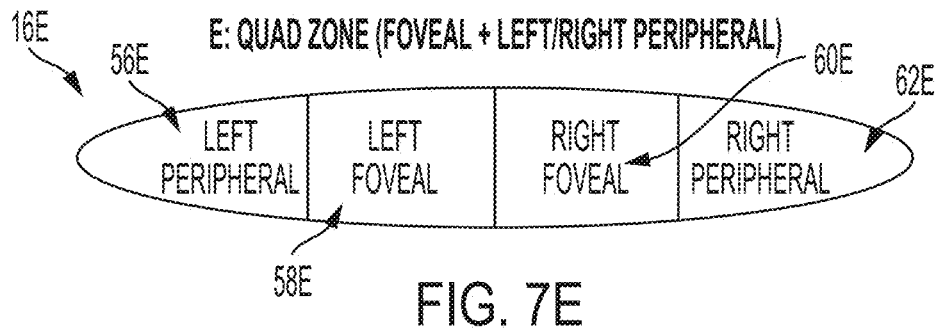

In FIG. 7E, an exemplary light emitter 16E may have quad-control zones. The light emitter 16E may have a left peripheral control zone 56E, a left foveal control zone 58E, a right foveal control zone 60E, and a right peripheral control zone 62E.

Figure 7F:
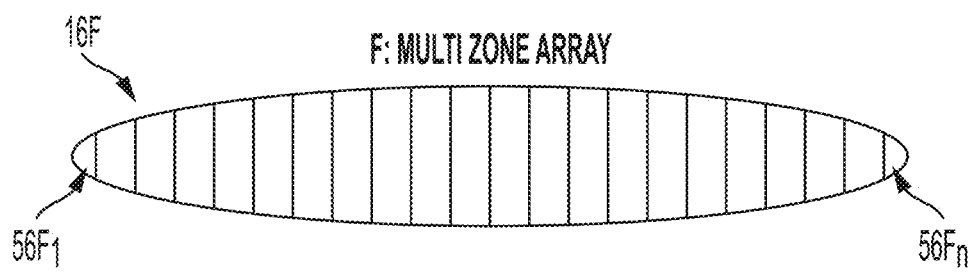

In FIG. 7F, an exemplary light emitter 16F may have multi-zone control (e.g., a multi-zone array). The multi-zone control may have multiple zones $56F_1$ through $56F_n$.

Figure 7G:
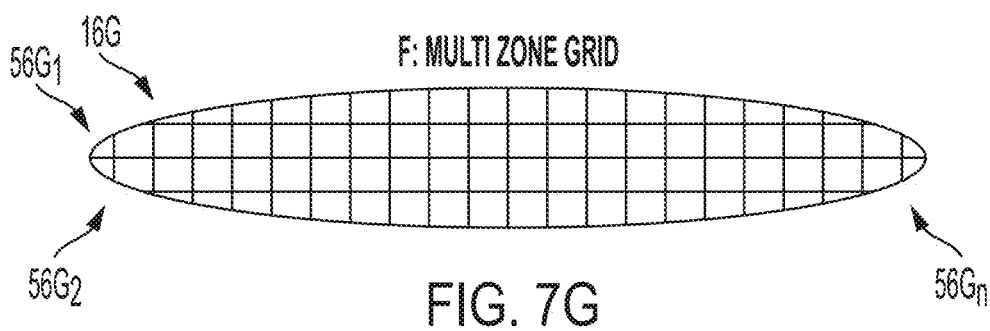

In FIG. 7G, an exemplary light emitter 16G may have multi-zone grid control. The multi-zone control may have multiple zones $56G_1$ through $56G_n$.

The examples of FIGS. 7A-7G may be combined (e.g., the multi-zone array may include left and right control, peripheral and foveal control, or combinations thereof). Each zone of the control zones may be controlled independently, separately, selectively, or combinations thereof.

Each control zone may include one or more LEDs. The LEDs may be distributed within each control zone. The distribution of LEDs within each control zone may affect blending and diffusion of color. The distribution of LEDS within each control zone may affect the complexity of wiring power and data to all the LEDs. The distribution of LEDS may be according to the Fibonacci sequence or other dense packing strategies. Depending on the level of diffusion, the specific placement of each LED may be undetectable to the subject.

Figure 8B:
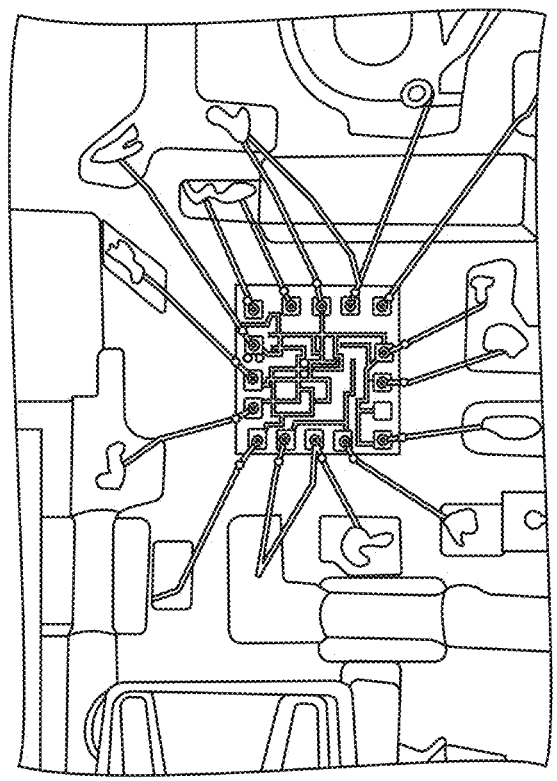
FIGS. 8A-8D illustrate exemplary systems of coupling a light emitting diode to a printed circuit board, according to an embodiment.
Figure 8A:
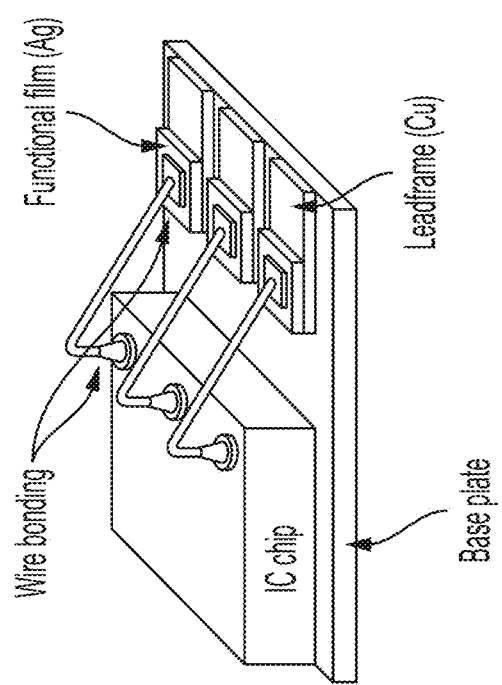
Figure 8D:
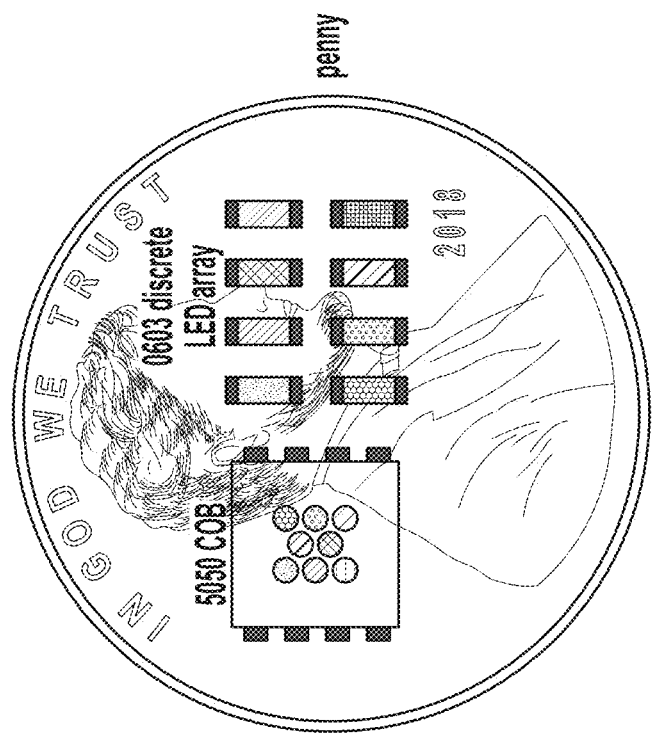
Figure 8C:
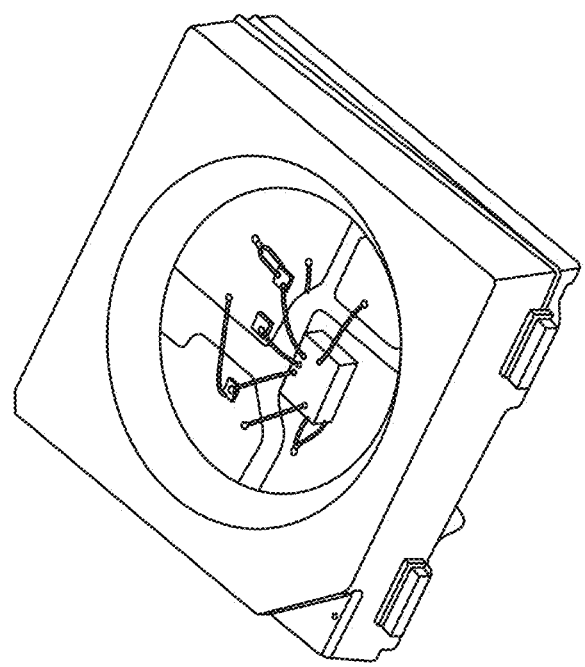

The LEDs may be coupled to the PCBs (e.g., to the lighting units 40). According to an embodiment, the LEDs may be wire bonded to the PCB, such as shown in FIGS. 8A-8C. Wiring-bonding is a process by which a bare silicon die is bonded to a very small PCB substrate. In an exemplary embodiment, the substrate may be about 0.2 in.×0.2 in. and each silicon die (e.g., an LED chip) may be about 0.02 in.×0.02 in. Wire bonding may allow for very dense packing of integrated circuits. In an exemplary embodiment, the LEDs may constitute discrete LEDs that are soldered to the PCB. In an embodiment, both wire bonding and soldering may be used to couple the LEDs to the PCB. FIG. 8D illustrates a comparison in size between a wire-bonded chip-on-board package containing an LED chip, and individual discrete LEDs.

Figure 9C:
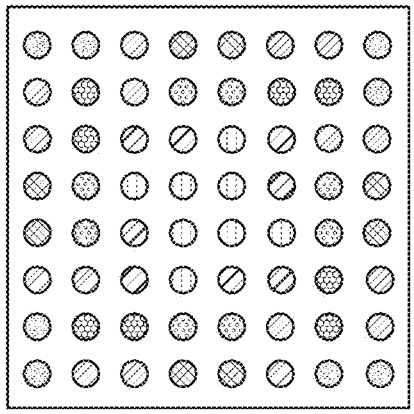
FIGS. 9A-9F illustrate exemplary light emitting diode arrangements, according to an embodiment.
Figure 9F:
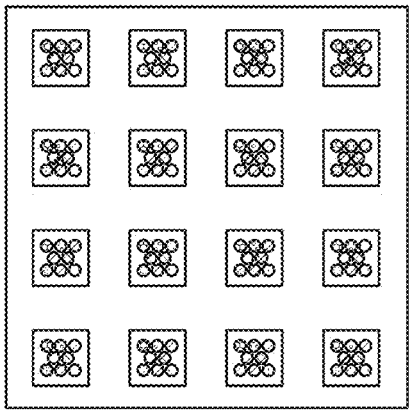
Figure 9B:
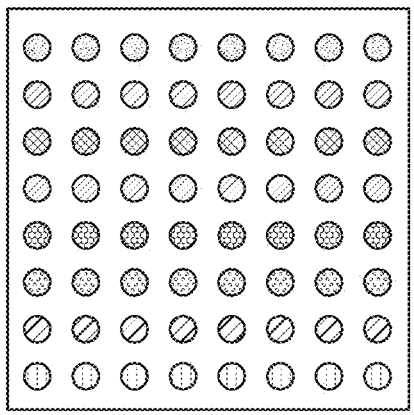
Figure 9E:
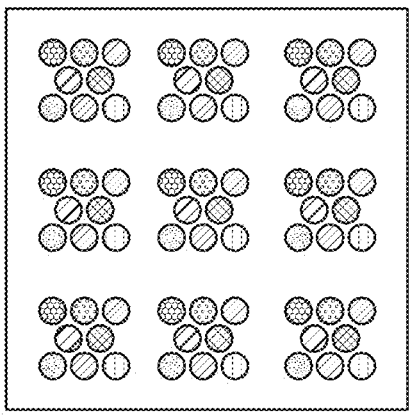
Figure 9A:
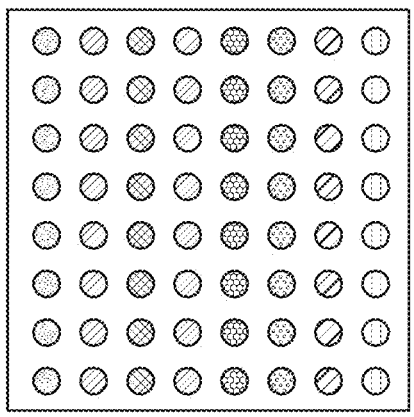
Figure 9D:
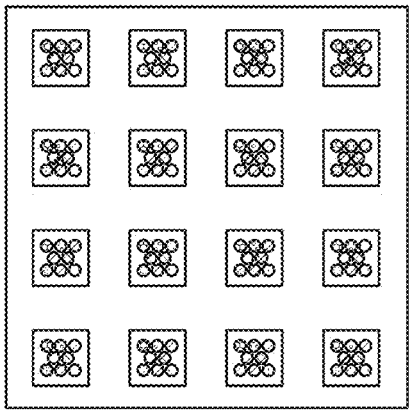

FIGS. 9A-9F show exemplary LED distributions for each control zone. Although depicted as a square, other shape control zones (such as those shown in FIGS. 7A-7G) may be provided. The LED distributions (e.g., packing strategies) of FIGS. 9A-9F illustrate eight (8) LEDs for each of eight (8) color channels. In FIG. 9A, an exemplary control zone may have the LEDs arranged in horizontal bands. In FIG. 9B, an exemplary control zone may have the LEDs arranged in vertical bands. In FIG. 9C, an exemplary control zone may have the LEDs arranged in radial bands. In FIG. 9D, an exemplary control zone may have the LEDs arranged in a semi-random nature. In FIG. 9E, an exemplary control zone may have the LEDs arranged as discrete LED clusters (approximating chip-on-board). In FIG. 9F, an exemplary control zone may have the LEDs arranged as small chip-on-board emitters. In one embodiment, one or more of the LEDs may constitute an organic LED (OLED), high-definition OLED (HD-OLED), and/or ultra-wide-gamut OLED. In one embodiment, all the LEDs in the device are of the same type. In another embodiment, the LEDs of are of different type. In one exemplary embodiment, some of the LEDs disposed in a central region of the field of view are OLED, HD-OLED, or ultra-wide-gamut OLED, while some of the LEDs disposed in a peripheral region of the field of view are non-organic LEDs. In one embodiment, the light emitter 16 includes one or more LEDs capable of emitting UV light at (and/or beyond) a peripheral region of the field of view of a user. In one embodiment, the one or more LEDs capable of emitting UV light at (and/or beyond) a peripheral region of the field of view of a user are configured to emit light in the UV wavelength without emitting light in visible wavelengths.

The diffuser material for the diffuser screen 32 may allow for the transmission of ultraviolet (UV) and/or infrared (IR) light. The diffuser material may affect the aesthetics and/or lighting performance of the diffuser screen 32. Transmission spectra curves of various polymers (e.g., polystyrene, cyclic olefin polymer or copolymer, polycarbonate, PMMA (acrylic), ultraviolet acrylic) that may be employed for the diffuser material 32 are published by GS Optics, and are incorporated herein by reference in their entireties. Some polymers may be able to transmit UV light down to approximately 350 nm. The diffuser material may be a polymer, quartz, UV-fused silica, float glass, or combinations thereof. The diffuser material may have a surface finish (e.g., bead blasting) that may scatter light. The diffuser material may have a dopant that may scatter light. Some of these materials may not be flexible and may require the diffuser screen 32 to be tiled with several or many smaller pieces together into a larger mosaic.

According to an embodiment, the entire diffuser screen 32 may be constructed of a single material with one level of opacity (either opacity within specific wavelength ranges or overall opacity). In another embodiment, the diffuser screen 32 may be constructed of multiple materials with different levels of opacity. In one exemplary embodiment, the diffuser screen 32 may be constructed of different materials depending on the location along the field of view of the diffuser screen 32. According to an embodiment, the diffuser screen 32 may be constructed of one or more UV-absorbing diffuser materials between a central to mid-peripheral region with a first level of opacity and one or more UV-transmissive diffuser materials between a mid-peripheral and a far-peripheral region with a second level of opacity. Examples of such UV-transmissive materials include, but are not limited to, quartz, glass, or UV-transparent polymers. In one embodiment, the diffuser screen 32 includes at least one of a wave bypass filter material, a tint layer, and a Fresnel lens.

According to an embodiment, the light emitter 16 may include a dual control zone having a foveal and peripheral control (e.g., FIG. 7B), may include a three piece mechanical PCB design (e.g., FIG. 2A) made from thin semi-flexible FR4 PCBs (with mechanical breaks between the foveal and peripheral zones), may include eight (8) discrete package LEDS controlled by at least two (and possibly three or four) discrete LED pulse width modulation (PWM) controllers, may include vertical (e.g., FIG. 9B) or horizontal (e.g., FIG. 9A) band packing strategy, and may include a polymer (not glass) diffuser material for diffuser screen 32.

The system of the present disclosure may include a diffuser screen including any combination of the aforementioned features. The diffuser screen may be shaped, sized, and designed to deliver a stimulus to a subject.

Light Entrainment

Figure 10A:
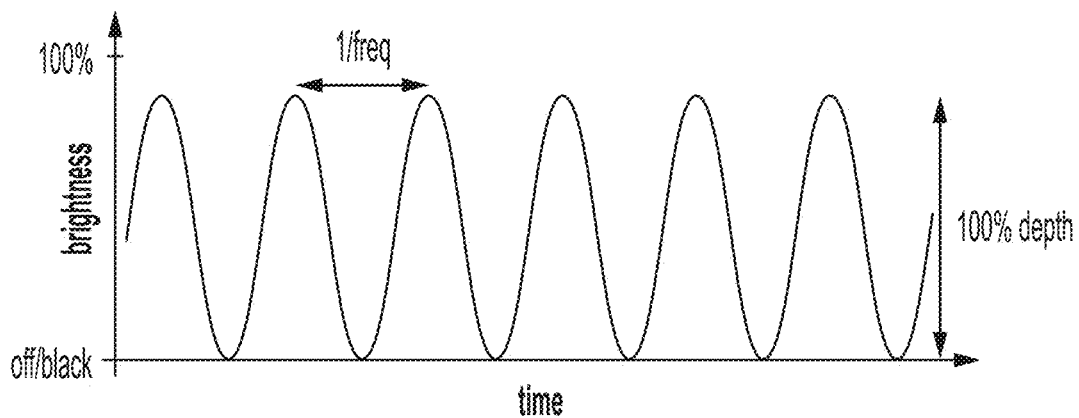
FIGS. 10A-10C illustrate example waves, according to different embodiments.
Figure 10B:
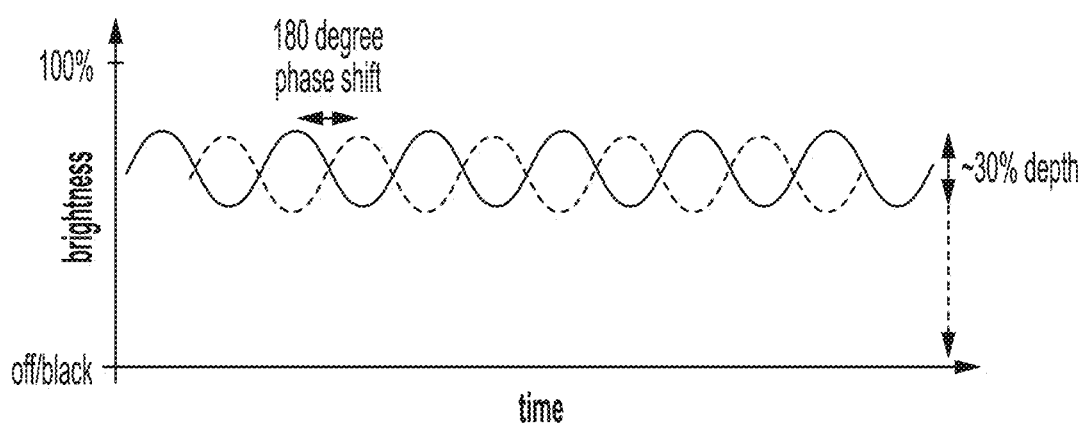
Figure 10C:
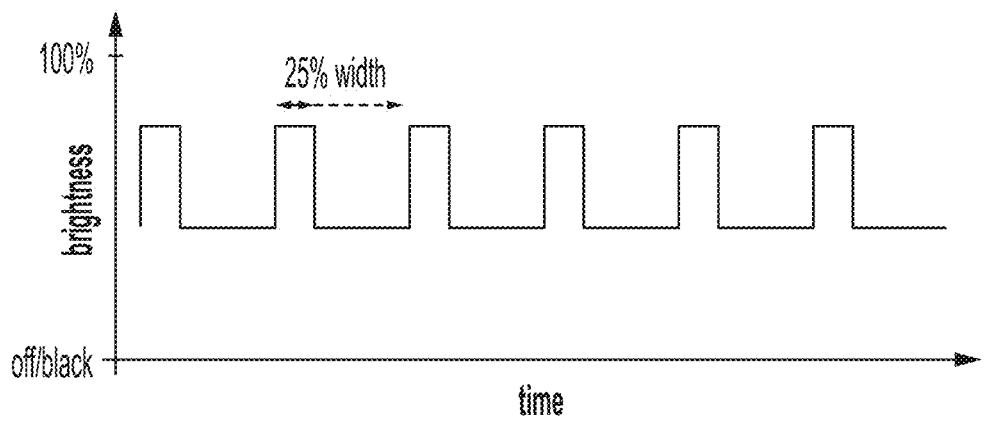

As described further below, the light emitter sub-system 140 may be configured to emit only visual wavelengths of light, only non-visual wavelengths of light (such as either UV light, IR light, or both), or a combination of both visual and non-visual wavelengths of light. The light emitter sub-system 140, including the individual wavelengths of light or combination of wavelengths of light described above, may be controlled by controller sub-system 130 to: (1) emit one or more wavelengths of light, (2) control the intensity, amount and/or retinal irradiance of the respective one or more wavelengths of light, (3) control the entrainment frequency or pulse rate of the respective one or more wavelengths of light (e.g., oscillations of the intensity of the respective one or more wavelengths of light), and/or (4) control the shape of the pulses of light (as illustrated in FIGS. 10A, 10B, and 10C).

For example, the entrainment frequencies of the respective one or more wavelengths of light may be controlled by the depth or relative dimming of amplitude between the brightest and dimmest parts of an oscillating wave may be controlled by a depth control. For example, a depth of 100% may indicate that a wave oscillates between a swatch (or selected) color and black, such as illustrated in the FIG. 10A. A depth of 80% may indicate that the wave oscillates between the swatch color and 80% dimmer than the swatch color. A 30% depth is illustrated in the wave of FIG. 10B. According to an embodiment, a width of a square wave, which indicates a proportion of the square wave that is in the max brightness state compared to the total period of the waveform, may be controlled by a pulse width control. For example, a pulse width of 25% may indicate that the wave is bright 25% of the time and dim 75% of the time, such as illustrated in wave of FIG. 10C.

The speed of the oscillations or pulse rate are controlled in order to increase likelihood of brainwave entrainment to a desired frequency or entrainment frequency. As indicated in Table 2 below, provided as an exemplary but not limiting example, entrainment frequencies may be provided in sequential stages in order to enhance likelihood of entrainment of a user in response to the applied stimulus.

TABLE 2

| | Stage | | | | |
|---|---|---|---|---|---|
| | Pre-Idle | Stage 1 | Stage 2 | Stage n | Post-Idle |
| Duration (time) | 1 minute | 1.5 minutes | 1.5 minutes | 1.5 minutes | 1 minute |
| Oscillation Frequency (Hz) | 0.1-1 Hz | Alpha | Theta and Alpha | Beta and Alpha | 0.1-1 Hz |

According to an embodiment, the pre-idle stage is provided in order to assuage a user for the entrainment frequencies of the later stages. The controller sub-system 130 sets an oscillation frequency in this stage at about the frequency of a person's resting heart rate of about 60 beats per minute (bpm) or slower or 64 bpm or slower. The oscillation frequency at this stage may be applied at a constant rate. The pre-idle stage provides a calming or relaxing sensation to the user to prepare for the entrainment oscillations of later stages. According to an embodiment, the sensor sub-system 110 may sense the user's heart rate and send the information in real-time to the controller sub-system 130. The controller sub-system 130 may dynamically adjust the oscillation frequency to match the user's heart rate based on the sensor sub-system 110.

According to an embodiment, in stages 1-3, the controller sub-system 130 sets an oscillation frequency to an entrainment frequency corresponding to one or more brainwave states. For example, a stage may provide a sweep of entrainment frequencies (such as incremental or continuous increase/decrease of frequency) within a frequency range of one brainwave state or two or more adjacent brainwave states. For example, another stage may provide alternating entrainment frequencies corresponding to within a frequency range of one brainwave state or between frequency ranges of two or more brainwave states. The inventors have discovered that the controlling the entrainment frequencies of light to emit over a plurality of frequencies (such as the sweeping or alternating entrainment frequencies) greatly enhances the likelihood of entrainment to a desired frequency. As illustrated in FIGS. 7A-7G, the different zones may be controlled to emit different wavelengths of light. According to an embodiment, the different zones may be further controlled to have a synchronized entrainment frequency. For example, the different zones of may be controlled to emit different colors or wavelengths of light, but all the zones are controlled to simultaneously sweep over a range of entrainment frequencies. Alternatively, the zones may be controlled to different entrainment frequencies. For example, as illustrated in FIG. 7D, the foveal zone 58D are controlled to oscillations corresponding to theta waves, while the left and right foveal zones are controlled to oscillations corresponding to alpha waves.

According to an embodiment, the light emitter sub-system 140 may be configured to emit the light directly to the eyes of a user, such as to only the foveal region of one or both eyes of the user, to only the peripheral regions of one or both eyes of the user, or a combination of both the foveal and peripheral regions of one or both eyes of the user. According to an embodiment, the light emitter sub-system 140 may be deployed to emit light to an entire room and/or a plurality of users.

According to an embodiment, controller sub-system 130 may be further configured to control sound and sensation to the user in conjunction with the control of the light emitter sub-system 140. In general, the methods and systems of emitting light as described herein may be used in conjunction with other stimuli, such as sound and haptics (or sensation), as described herein. For example, the stimuli (e.g., light, sound, tactile) can be synchronized according to the control aspects described above.

Emitter Control Based on Audio

Figure 11:
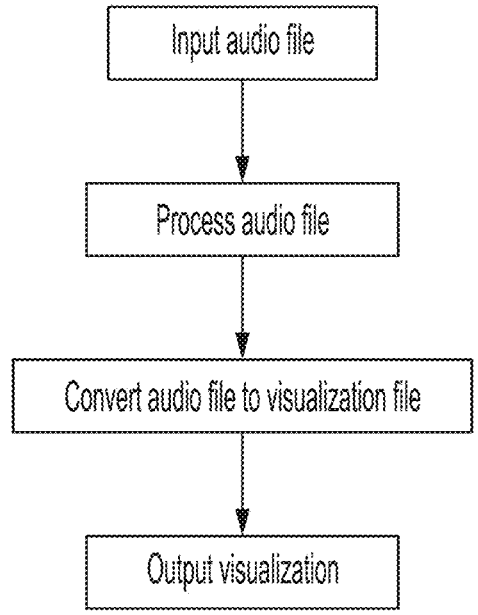
FIG. 11 illustrates a method of controlling a stimulus.

As illustrated in FIG. 11, a controller sub-system 130 or other computing system may convert an audio file into a corresponding visualization file to be used with the light emitter sub-system 140 and bone conduction sub-system 170, or the light emitter sub-system 140 and sound emitter sub-system 150.

According to an example embodiment, the controller sub-system 130 may be configured to receive audio data as an input, and to control one or more of the light emitter sub-system 140, sound emitter sub-system 150, tactile emitter sub-system 160, and/or bone conduction sub-system 170, according to the audio data. For instance, the audio data may be provided to the controller sub-system 130 as an audio file or streaming audio content, through a wired connection (e.g., USB), media (e.g., SD card), or wireless connection (e.g., Bluetooth, WiFi). In an example embodiment, the audio data provided to the controller sub-system 130 is mono or stereo and has a 48 kHz sampling rate and 16-bit fidelity (the same as that of a compact disc). In an example embodiment, the audio data is a .wav or .mp3 audio file uploaded from an external source.

The controller sub-system 130 may be configured to analyze the audio data to determine an appropriate emission corresponding to the audio data. For instance, the controller sub-system 130 may perform a short-time Fourier transform on the audio data to determine frequency and/or amplitude of light emission by the light emitter sub-system 140. In an example embodiment, the processing may, based on analysis of the audio data, create multiple visualization files corresponding to channels of light emission by the light emitter sub-system 140.

As one example, the light emitter sub-system 140 includes 8 channels of LEDs, each channel independently controlled according to a 2 kHz, 12-bit pulse-width modulation (PWM) signal output to a TIP120 bipolar junction transistor. With the PWM signal having a 2 kHz frequency, a flicker rate of up to 1 kHz may be selected by the controller sub-system 130 for each LED channel. With the pulse-width modulation signal having a 12-bit fidelity, 4096 different intensities may be selected by the controller sub-system 130 for each LED channel. In such a case, the controller sub-system 130 may create eight independent visualization files on a 12-bit map, assigned to each LED channel. It will be appreciated that other frequencies and/or fidelities may be used without departing from the spirit of the invention. For instance, the PWM signal may incorporate a 30 kHz frequency and/or a 16-bit fidelity.

The control of each LED channel may include a certain flicker rate based on the analysis of the audio data. The controller sub-system 130 may determine a maximum and minimum flicker rate for each LED channel, and control each LED channel of the light emitter sub-system 140 independently according to the determined maximum and minimum flicker rates.

The control of each LED channel may include a certain brightness based on the analysis of the audio data. The controller sub-system 130 may determine a maximum and minimum brightness for each LED channel, and control each LED channel of the light emitter sub-system 140 independently according to the determined maximum and minimum brightnesses.

In an example embodiment, the user may be provided with an option to control the range of light emission brightnesses and/or the range of light emission flicker rates for the experience. In an example embodiment, the controller sub-system 130 may, if the user changes the brightness range or the flicker rate, notify the user that such change may reduce the overall experience compared to the brightness and/or flicker rate ranges determined by the controller sub-system 130.

In an example embodiment, the user may be provided with an option to control a number of stages of the experience and/or the duration of each stage. In an example embodiment, the user may be provided with an option to create the audio data to be analyzed by the controller sub-system 130 for the experience.

According to an example embodiment, the controller sub-system 130 may control the sound emitter sub-system 150 based on the audio data. For example, the sound emitter sub-system 150 may include Bluetooth wireless headphones worn by the user or a Bluetooth speaker, and the controller sub-system 130 may control the wireless headphones or speaker to emit the audio data. According to an example embodiment, the controller sub-system emits the audio data through the wireless headphones or speaker in synchronization with light control of the light emitter sub-system, according to the audio data.

According to an example embodiment, the controller sub-system 130 may control the bone conduction sub-system 170 based on the audio data. For example, the sound emitter sub-system 150 may include Bluetooth wireless bone conduction headphones worn by the user, and the controller sub-system 130 may control the wireless headphones to emit the audio data. According to an example embodiment, the controller sub-system emits the audio data through the bone conduction headphones in synchronization with light control of the light emitter sub-system, according to the audio data.

Emitter Control Based on API

Figure 12:
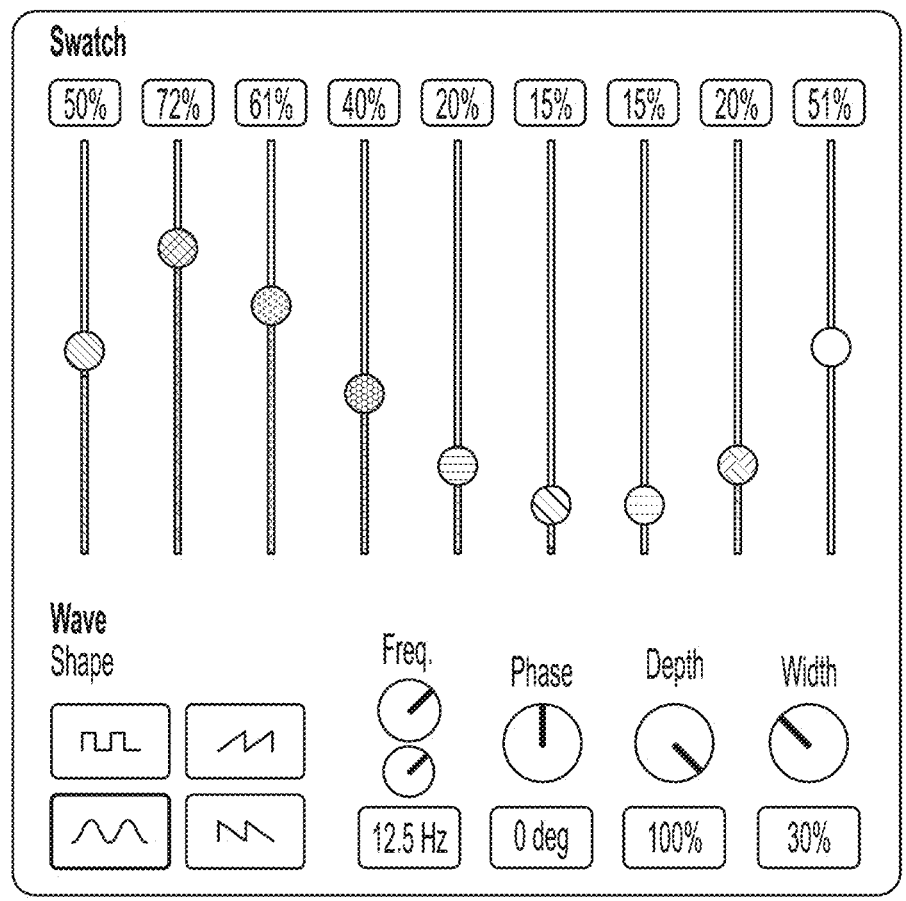
FIG. 12 illustrates an example user control interface.
Figure 13:
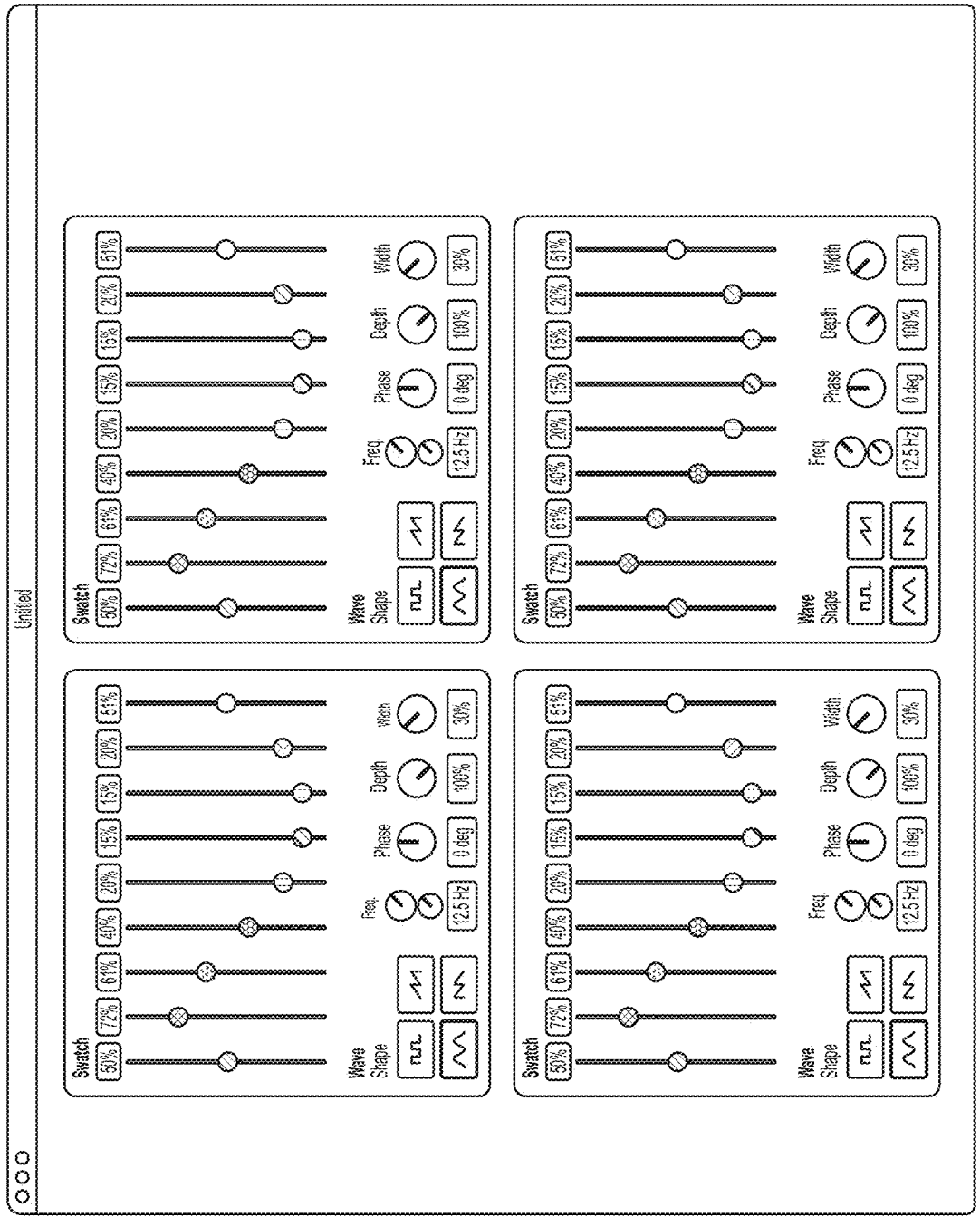
FIG. 13 illustrates an example user control interface.

According to an example embodiment, the controller sub-system 130 may control an array of lights of the device. For example, one or more lights of the light emitter sub-system 140 may be controlled by an application programming interface (API), such as a musical instrument digital interface (MIDI) API. According to an example embodiment, the API may be a physical control surface such as, for example, but not limited to an AKAI MIDIMIX controller or other physical control surface. According to an example embodiment, the API may be a virtual control surface such as, for example, but not limited to a LEMUR controller or other virtual control surface. According to an example embodiment, the API may be a digital audio workstation (DAW) automation lane control surface such as, for example, but not limited to an Ableton controller or other automation lane control surface. The API may provide creative control to a user and/or enable repeatable and replayable experiences of the device. Example user interfaces are illustrated at FIGS. 12 and 13, which provide the various controls described below.

According to an embodiment, the controller sub-system 130 may include an oscillator to control the one or more lights of the light emitter sub-system 140. The oscillator may generally include any number of controls described above, such as a swatch control and a wave control. As explained in more detail below, a single oscillator may be used or a plurality of oscillators may be used in combination to control the one or more lights of the light emitter sub-system 140.

The swatch may include a mixture of different color channels to control the color or colors of the one or more lights of the light emitter sub-system 140. According to an embodiment, the swatch may further include a brightness control to control the brightness of the one or more lights of the light emitter sub-system 140. The mixture of different color channels may be a mixture of 8 individual LED color channels. According to other embodiments, the mixture of different color channels may be a mixture of other numbers of individual LED color channels, such as greater than 8 different color channels, 16 or more different color channels, 24 or more different color channels, 32 or more different color channels, 48 or more different color channels, 64 or more different color channels, and so on. According to an embodiment, each individual LED color channel may correspond to a different light of the light emitter sub-system 140. According to an embodiment, the color channel for each LED may be linked or correspond to each number in a range of 0-127 MIDI values.

According to an embodiment, the brightness control may be a master brightness that controls the brightness of the one or more lights of the light emitter sub-system 140. The brightness output of a light may be the product of a light's color channel brightness and the light's master brightness. The brightness control may control one or both of color channel brightness and/or master brightness. According to an embodiment, the brightness control may adjust the brightness of one, some, or all of the color channels of the swatch described above. For example, where the color channel for each LED is linked or corresponds to each number in a range of 0-127 MIDI values, each color channel in the range of 0-127 MIDI values may be modulated by the master brightness control such that a range of $128^2$ (or 16,384) unique brightnesses may be selected for each color channel. According to an embodiment, the multiplied value may be mapped to a $2^{12}$ pulse width modulation (PWM) number to control the one or more lights of the light emitter sub-system 140.

The wave control may include a time-varying brightness of the swatch. For example, the wave control may modulate the swatch from a default state to a brightness that is equal to or dimmer than the default state. The time-varying brightness of the swatch may correspond to a wave shape, such as a square wave, a sine wave, a saw up wave, and/or a saw down wave. According to an embodiment, wave shapes may be linked or correspond a range of numbers within the 0-127 MIDI values. For example, values in the range of 0-31 may be a square wave, values in the range of 32-63 may be a sine wave, values in the range of 64-91 may be a saw up wave, values in the range of 92-127 may be a saw down wave. According to an embodiment, a single oscillator may have wave control according to only one wave shape, such as a sine wave. According to an embodiment, when a plurality of oscillators is used, different oscillators may have different wave shapes.

According to an embodiment, the rate of wave oscillation or frequency between a maximum brightness and a minimum brightness may be provided through a frequency control. In order to obtain a high degree of control, the frequency control may provide both coarse frequency control and fine frequency control. According to an embodiment, the coarse frequency control may control integer frequency between 0-127 Hz, and the fine frequency control may control from 0.00 Hz to 0.99 Hz. In combination, the coarse frequency control and the fine frequency control may provide a range of control from 0.00 Hz to 127.99 Hz in 0.01 Hz increments.

According to an embodiment, phase control of the waves may be provided. For example, phase control may provide phase shift of a wave relative to other waves. As explained above, for example, multiple oscillators may be concurrently used and one or more waves from the respective one or more oscillators may be shifted relative to the other waves. A 180-degree phase shift is illustrated in the wave of FIG. 10B. The phase shift to offset the different waves may be used to provide different flickering patterns of the one or more lights of the light emitter sub-system 140. According to an embodiment, the phase may be controlled by a single MIDI control from 0-127 MIDI values. The 0-127 MIDI values may adjust phase from a negative phase angle to a positive phase angle. For example, each integer value in the 0-127 MIDI value range may provide 5-degree angle shift to give a total range of 640-degrees of phase angle shift. According to an embodiment, different angle shifts may be provide for each integer value in the 0-127 MIDI value range, such as a 1-degree angle shift, greater than 5-degree angle shift, or other angle shifts.

According to an embodiment, the depth or relative dimming between the brightest and dimmest parts of a wave may be controlled by a depth control. For example, a depth of 100% may indicate that a wave oscillates between the swatch color and black, such as illustrated in the wave of FIG. 10A. A depth of 80% may indicate that the wave oscillates between the swatch color and 80% dimmer than the swatch color. A 30% depth is illustrated in the wave of FIG. 10B. According to an embodiment, the depth control may be provided by a single MIDI control channel. According to an embodiment, a single MIDI control channel with a range of 0-127 MIDI values may be mapped to depth values from 0% to 100%.

According to an embodiment, a width of a square wave, which indicates a proportion of the square wave that is in the max brightness state compared to the total period of the waveform, may be controlled by a pulse width control. For example, a pulse width of 25% may indicate that the wave is bright 25% of the time and dim 75% of the time, such as illustrated in the wave of FIG. 10C. According to an embodiment, a single MIDI control channel with a range of 0-127 MIDI values may be mapped to pulse values from 0% to 100%.

According to an embodiment, a single oscillator may include a number of channels corresponding to any number of control channels described above. For example, a single oscillator may include 15 channels (8 color channels, 1 master brightness channel, 1 shape channel, 2 frequency channels, 1 phase channel, 1 depth channel, and 1 width channel). The number of channels included with a single oscillator may vary depending on the number of controls desired, such as if more color channels are desired. For example, FIG. 12 is an example user interface to control a single oscillator according to the controls described above.

According to an embodiment, any number of oscillators may be used with the device. For example, a plurality of oscillators, such as 4 unique oscillators, may be used to provide a large variety of distinctive flickering patterns. If each oscillator includes 15 channels, the device may be controlled with 60 channels as automation lanes. For example, FIG. 13 is an example user interface to control 4 oscillators according to the controls described above.

According to an embodiment, the system 100, such as implemented in a wearable device, may be used by a user to alter the user's cognitive state or increase likelihood of altering their brainwaves.

The sensor sub-system 110 of the system 100 may sense and track biometric data related to emotional, behavioral, cognitive, and/or sleep quality or function of the user, as explained above.

The controller sub-system 130 may determine or predict the cognitive state or dominant brainwave of the user based on the biometric data.

The controller sub-system 130 may suggest a modification to the user's cognitive state or dominant brainwave based on the biometric data. Alternatively, the user may select a desired cognitive state or desired dominant brainwave, or the modification selected by the controller sub-system 130.

After the user selects the cognitive state or brainwave, the user may raise the device(s) (which has/have already been placed on the forearms, wrists, or hands) to the eyes so that the devices can apply the photo-stimulation to the eyes, and tactile-stimulation to the eyes and face, and optional auditory-stimulation to the user, as explained above, to illicit the desired modification to the user's brainwaves or altered cognitive state. For example, the stimulations may illicit or increase the likelihood of a dominant brainwave or altered cognitive state.

According to an embodiment, the controller sub-system 130 may use an algorithm to elicit or increase the likelihood of a dominant brainwave or altered cognitive state. For example, if the system 100 senses an elevated level of stress in the user, the controller sub-system 130 can use the algorithm to suggest a level of photo-stimulation, tactile-stimulation, and/or auditory-stimulation to modify the user's brainwaves to alleviate the stress. According to an embodiment, the controller sub-system 130 may use the algorithm to suggest a level of photo-stimulation, tactile-stimulation, and optional auditory-stimulation to produce a temporary hallucination or feeling of euphoria in the user.

The algorithms used by the controller sub-system 130 may be constructed from multimodal physiological data, including from measurement of brainwave activity, combined with the subjective reports of emotional and/or stress states of a user before and after stimulation is applied. The physiological and subjective data sets may be used to train a machine learning algorithm in a supervised learning procedure that classifies brainwave composition and cognitive/emotional states based upon the user's biometric data. The machine learning framework may include the construction of proprietary predictive algorithms used by the controller sub-system 130 that specify optimized stimulation parameters from the emitter sub-systems based upon feature extraction from multimodal biosignals, classification of user states, and predictive model validation. The controller sub-system 130 algorithm may use the user's biometric data to assign personalized stimulation properties to the emitter sub-systems described above.

Wearable Embodiment

According to an example embodiment, at least a portion of the system 100 may be implemented as one or more devices worn on the body of a user (also known as a "wearable device"). For example, the system 100 may be provided on each of a user's forearms, wrists, or hands. According to an example embodiment, the entirety of the system 100 may be implemented as one or more wearable devices.

Figure 14:
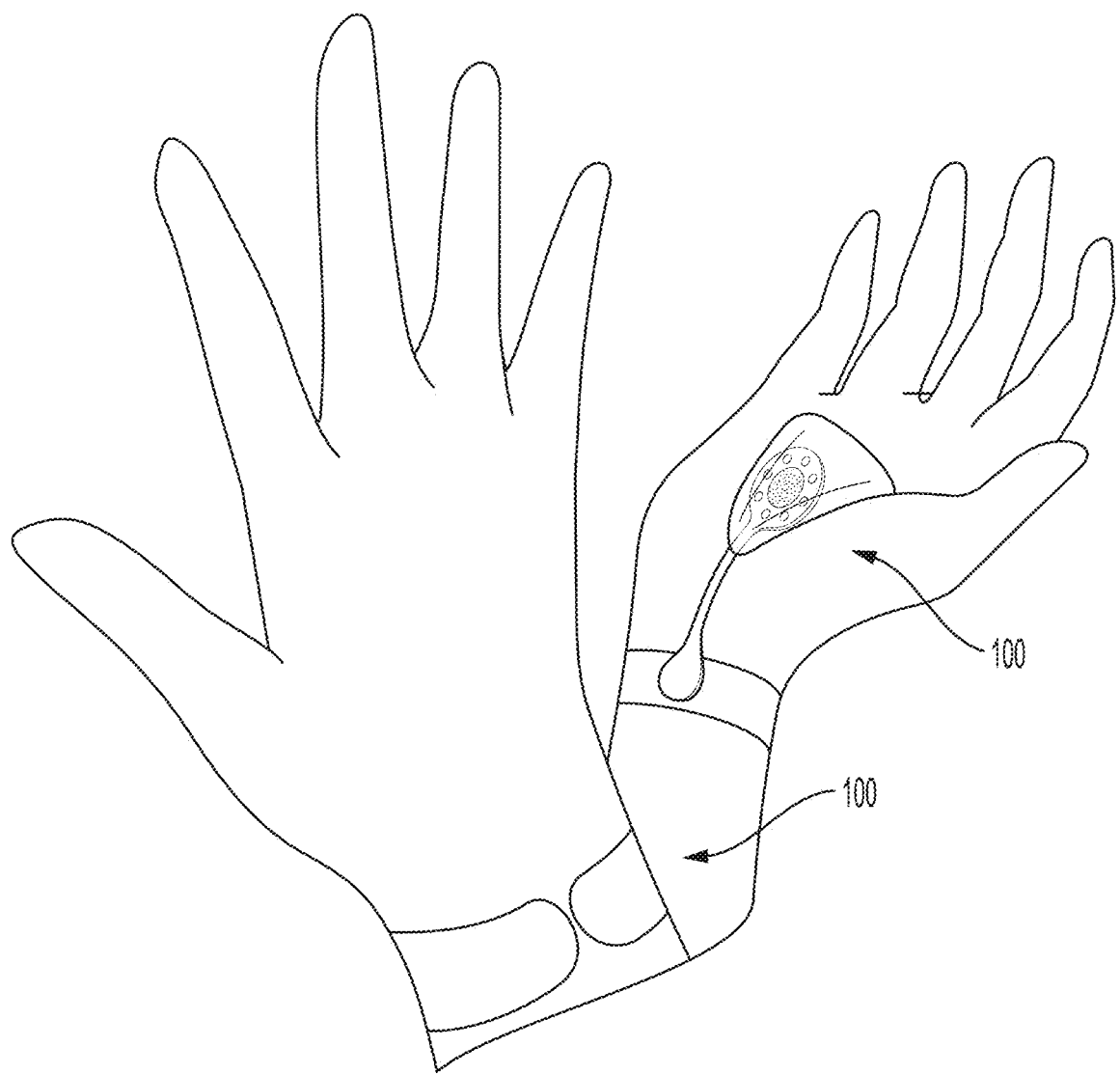
FIG. 14 illustrates an example device worn by a user, according to an embodiment.

According to an example embodiment, the system 100 may be implemented as one or more wearable devices, worn on a body of the user so that one or more markers of the user's parasympathetic nervous system is sensed by the sensor sub-system 110 and recorded by the controller sub-system 130. One example embodiment, implemented as two wristbands or armbands, is illustrated in FIG. 14. Although this embodiment is described with respect to two wristbands, the system may be implemented with a single wristband, with three or more wristbands, or with bands that are worn on parts of the body other than the wrist, without deviating from the spirit of the invention.

Figure 15:
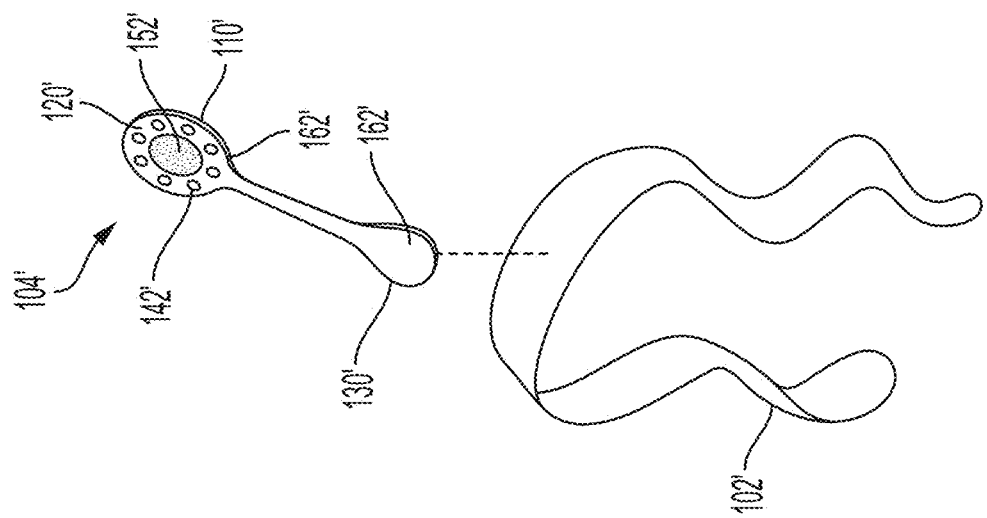
FIG. 15 illustrates an example device, according to an embodiment.
Figure 15:
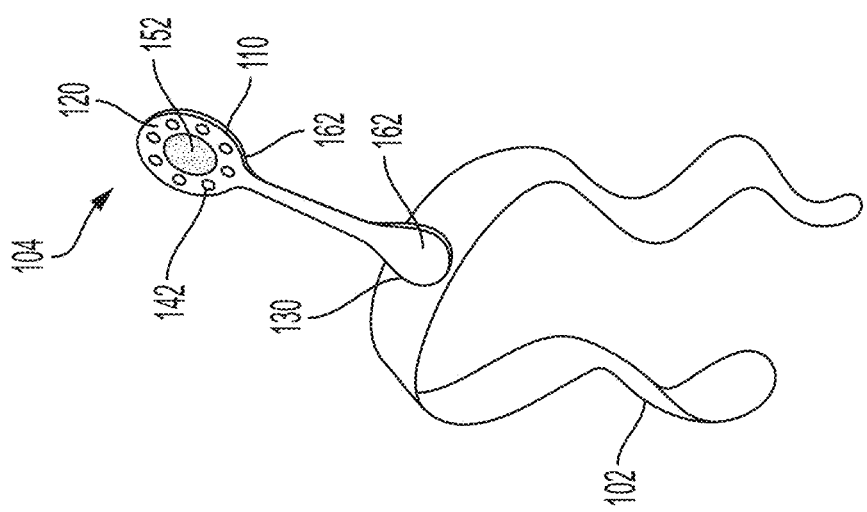

As shown in FIG. 15, the system 100 may be constructed as two wristband assemblies, each having a band 102 and an emitter assembly 104. According to an embodiment, the emitter assembly 104 may include the sensor sub-system 110, the emitter sub-system 120, and the controller sub-system 130. The emitter assembly 104 may further include wired or wireless transceivers to communicate with each other. For example, the controller sub-systems 130 of the emitter assembly 104 may communicate with each other via the respective transceivers. According to an embodiment, the band 102 may include one or more of the sensor sub-system 110 and/or the controller subsystem 130, or portions of the sensor sub-system 110 and/or the controller subsystem 130. The band 102 may also include portions of the emitter sub-system 120.

According to an embodiment, as illustrated at FIGS. 14-15, the one or more sensors of the sub-sensor system 110 may be integrated into the system 100 when implemented as a wearable device. For example, the one or more sensors of the sensor sub-system 110 may be located in the band 102 or the emitter assembly 104, to sense one or more biometric markers at the inner wrist facing a first direction through the wrist.

According to an embodiment, one or more lights 142, forming part of the light emitter sub-system 140 of the emitter sub-system 120, may be provided at an end of the emitter assembly 104. In this example, the one or more lights 142 may be provided at a perimeter or circumference of the surface of the emitter assembly 104 and may be outwardly facing from a user's palm when in use. The one or more lights may be, for example, a micro-light emitting diode (micro-LED) configured to emit light at a predetermined frequency and brightness (e.g. photo-stimulation), according to the controller sub-system 130. For example, the one or more lights may provide a visual stimulus (for example, photo-stimulation) to the user when the light emitter sub-system 140 is moved to a location adjacent to the user's face and eyes. The light emitter sub-system 140 may be sized so that all emitted light is applied to the foveal area of one or both eyes of the user. According to an embodiment, the one or more lights may be covered with a diffuser material to reduce intensity of one or more wavelengths of light. Alternatively, no diffuser material covers the one or more lights so that the full emitted spectrum of light wavelengths is directly applied to the user. The light may be applied directly to the foveal region of the user's eyes when the eyes are open, or when the eyes are closed.

According to an embodiment, one or more speakers 152, forming part of the sound emitter sub-system 150 of the emitter sub-system 120, may be provided at one or both ends of the emitter assembly 104. The one or more speakers 152 may be provided within the perimeter or circumference of the surface of the emitter assembly 104 and may be outwardly facing from a user's palm when in use.

According to an embodiment, the tactile emitter sub-system 160, forming part of the tactile emitter sub-system 160 and/or the bone conduction sub-system 170 of the emitter sub-system 120, may be located in the wearable device. The one or more motors 162 may be provided at an end of the emitter assembly 104. In this example, the one or more motors 162 are provided at one or both ends of the emitter assembly 104 in order to provide tactile stimulation towards the palm and/or wrist of the user and/or bone conduction stimulation if the wearable device is contacted to a bone conduction-sensitive area of the user's body (e.g., jawbone or cheekbone). According to an embodiment, the one or more motors 162 may be provided with the band 102 in order to provide tactile stimulation to the wrist of the user and/or bone conduction stimulation to the bone conduction-sensitive area of the user's body.

According to an embodiment, the band 102 may be a flexible, thin, silicon or silicon-like cuff and may be configured to hold electronics or portions associated with the various systems described below. The emitter assembly 104 may configured to hold electronics or portions associated with the various systems described below. The emitter assembly 104 may include a patch configured for affixation to, or held in the palm of a user when in use.

According to an example embodiment, the emitter assembly 104 may be detachably affixed to the band 102. For example, the emitter assembly 104 and the band 102 may be affixed together by one or more magnets (not shown) integrated into one or both of the emitter assembly 104 and the band 102 at their contact points. The magnets provide retention of emitter assembly 104 and the band 102 based on magnetic force, while permitting the user to detach the emitter assembly 104 while continuing to wear the band 102.

According to an example embodiment, only a single controller sub-system 130 is provided in one wristband assembly among multiple wristband assemblies. For instance, a first wristband assembly may include a sensor sub-system 110 and an emitter sub-system 120, and a controller sub-system 130, while a second wristband assembly may include contain a sensor sub-system 110' an emitter sub-system 120', and optionally a controller sub-system 130'. The controller sub-system 130 provided in the first wristband may receive sensed data from both sensor sub-systems 110 and 110' and also control both emitter sub-systems 120 and 120'. Of course, it will be appreciated that the controller sub-system 130 may alternatively be provided in the second wristband instead of the first wristband. It will be further appreciated that the sensor sub-systems 110 and 110' may be identical or may be different. For instance, in the case that the sensor sub-systems are different, the various sensors provided in the system 100 may be divided amongst the sensor sub-systems 110 and 110'. In the case that the sensor sub-systems are identical, the multiple sensors for each sensing criteria may provide redundancy and/or additional sensor readings specific to the individual parts of the body for which the particular wristband is worn. Likewise, the emitter sub-systems 120 and 120' may be identical or may be different to collectively provide the functionality to apply the various stimuli to the user.

According to an embodiment, the system 100 may be implemented as one or more patches applied to a body of a user, such as to the wrists or palms, with an adhesive or a material that is able to adhere to the skin of the user. The two patches of the system 100 may each contain a sensor sub-system 110, an emitter sub-system 120, and a controller sub-system 130. The patches may further include transceivers to communicate with each other. For example, the respective controller sub-systems 130 may communicate with each other via respective transceivers.

According to an embodiment, only a single controller sub-system 130 is provided among multiple patches. For instance, a first patch may include a sensor sub-system 110, an emitter sub-system 120, and a controller sub-system 130, while a second patch may include a sensor system 110' and an emitter system 120'. The controller sub-system 130 provided in the first patch may receive sensed data from both sensor sub-systems 110 and 110' and also control both emitter sub-systems 120 and 120'. According to an embodiment, the controller sub-system 130 may be provided in the second patch instead of the first patch. According to an embodiment, the sensor sub-systems 110 and 110' may be identical or may be different. For instance, in the case that the sensor sub-systems are different, the various sensors provided in the system 100 may be divided amongst the sensor sub-systems 110 and 110'. In the case that the sensor sub-systems are identical, the multiple sensors for each sensing criteria may provide redundancy and/or additional sensor readings specific to the individual parts of the body for which the particular patch is worn. Likewise, the emitter sub-systems 120 and 120' may be identical or may be different to collectively provide the functionality to apply the various stimuli to the user.

According to an embodiment, as illustrated in FIGS. 14 and 15, one or both wristbands or armbands may include one or more lights of the light emitter sub-system 140. According to an embodiment, one or both patches may include one or more lights of the light emitter sub-system 140.

According to an embodiment, as illustrated in FIGS. 14 and 15, one or both wristbands or armbands may include one or more speakers of the sound emitter sub-system 150. According to an embodiment, one or both patches may include one or more speakers of the sound emitter sub-system 150.

According to an embodiment, one or both wristbands or armbands may include one or more motors of the tactile emitter sub-system 160. According to an embodiment, one or both patches may include one or more motors of the tactile emitter sub-system 160.

According to an embodiment, one or both wristbands or armbands may include one or more motors of the bone conduction system 170. According to an embodiment, one or both patches may include one or more motors of the bone conduction sub-system 170.

It will be appreciated that the functionality described with respect to emitter assembly 104 and motors 162 is likewise applicable to emitter assembly 104' and motors 162'.

Therapeutic Embodiment

According to an example embodiment, at least a portion of the system 100 may be implemented as a therapeutic device.

Figure 16:
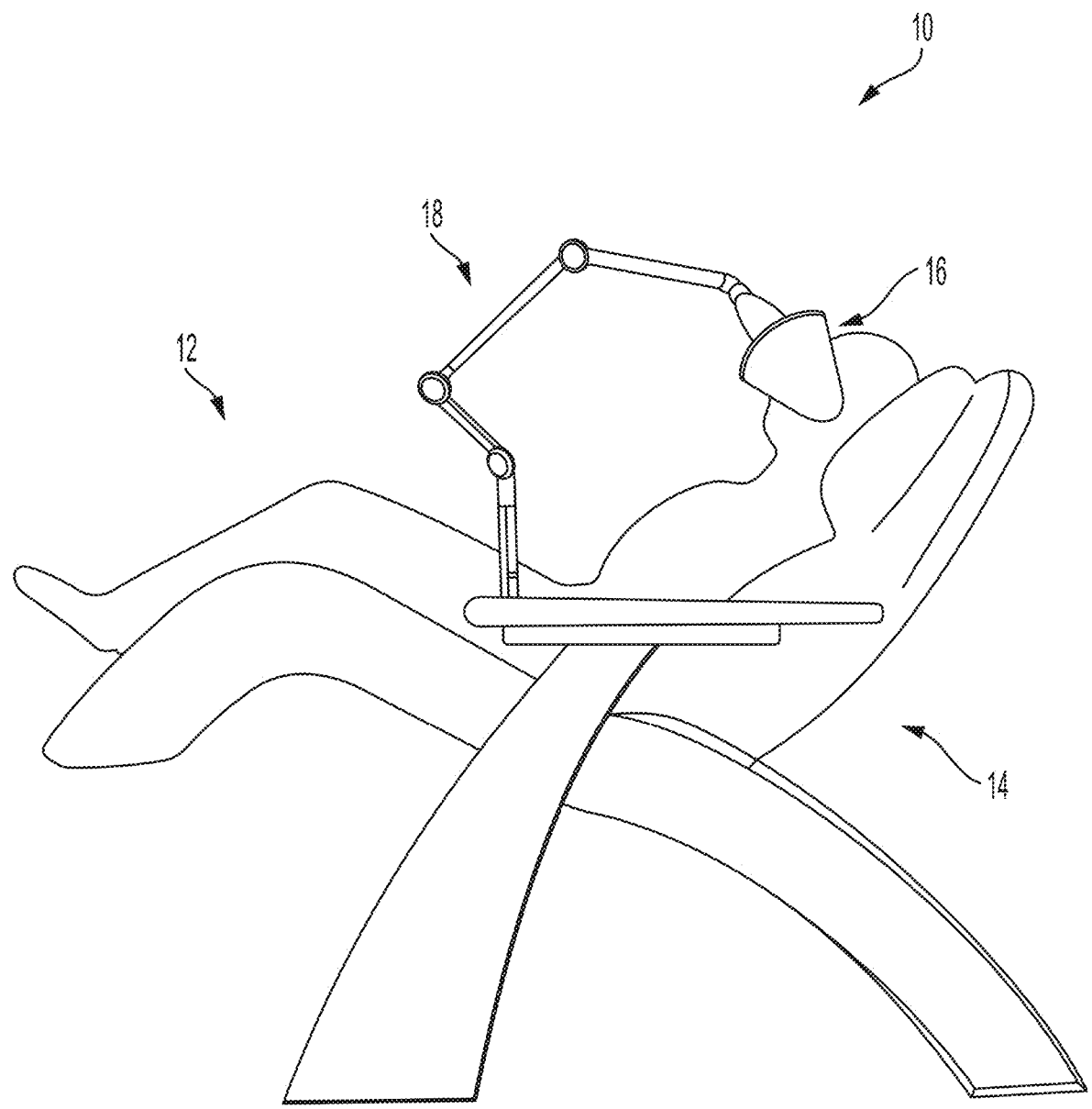
FIG. 16 illustrates an example therapeutic device, according to an embodiment.

In an embodiment, illustrated in FIG. 16, the system 100 may include a chair 14, the light emitter 16, and a connecting device 18 that couples the light emitter 16 to the chair 14. The chair 14 may be adjustable in various aspects including but not limited to, recline/tilt, head or foot rest adjustment, lumbar adjustment, and/or any other adjustment. According to an embodiment, the adjustability of these elements includes adjustment in both translation and orientation directions. According to an embodiment, the chair 14 is of a category as a "zero gravity" chair. The light emitter 16 emits light towards a subject 12, as described in further detail below. The connecting device 18 may be an articulating arm, a jointed linkage, or other device capable of positioning and/or orienting the light emitter 16 in relation to the subject 12 and/or the chair 14. According to an embodiment, the connecting device 18 may couple the light emitter 16 to a different support component separate from the chair 14, such as a ceiling or a wall. The system 10 may apply one or more stimuli in order to increase the likelihood of a desired brain wave or state, as described herein.

Figure 17:
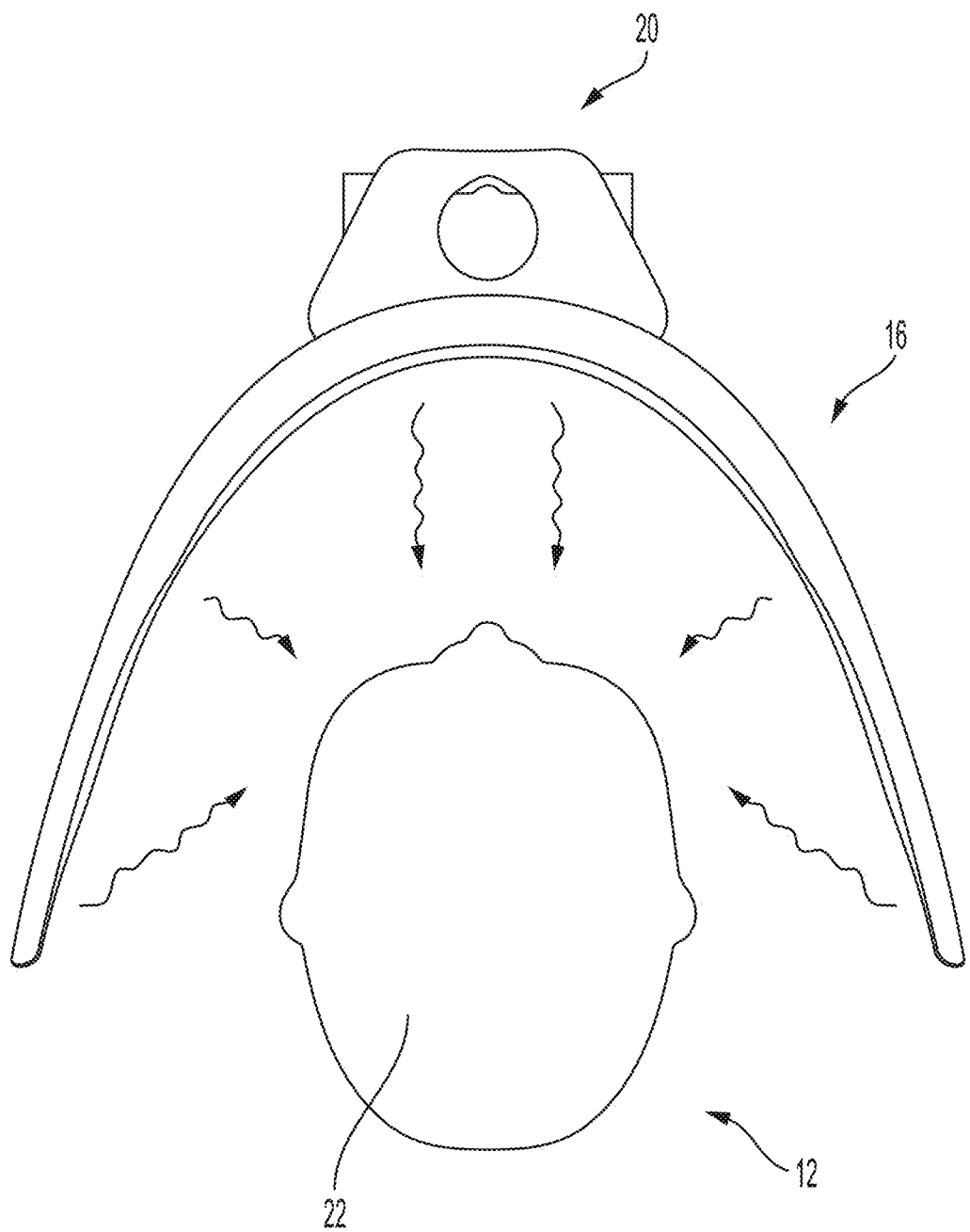
FIG. 17 illustrates an example light emitter, according to an embodiment.
Figure 18A:
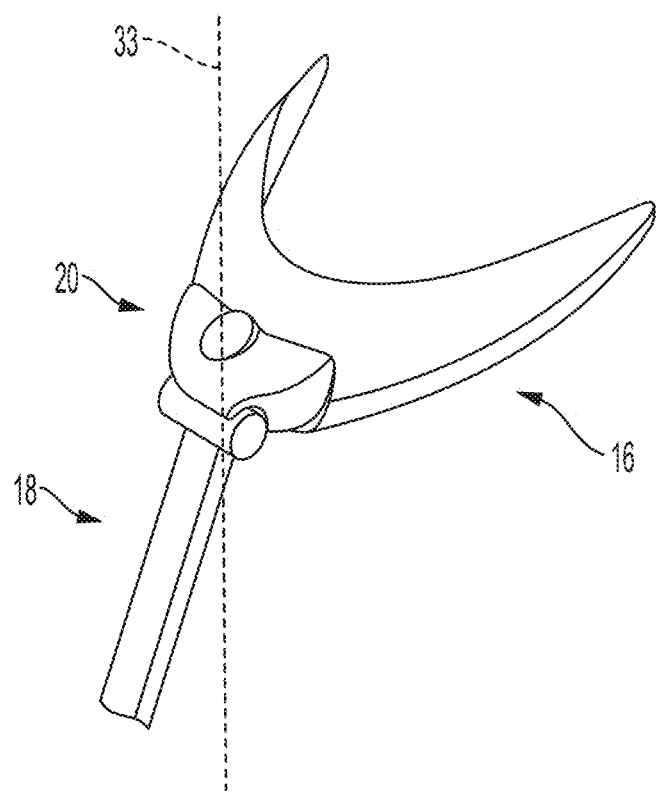
FIGS. 18A and 18B illustrate perspective views of an example light emitter, according to an embodiment.
Figure 18B:
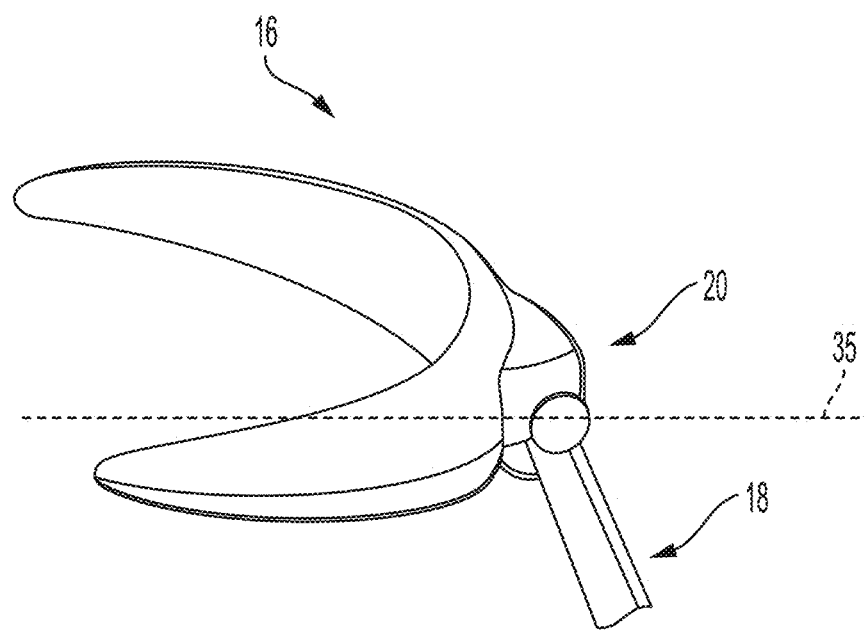

In an embodiment, FIG. 17 illustrates an overhead view of the light emitter 16 emitting light towards the subject 12, while FIGS. 18A and 18B illustrate various perspective views of the light emitter 16. The light emitter 16 may include or be coupled to a connector 20. The connector 20 may connect the light emitter 16 to the connecting device 18 (as shown in FIG. 16). As described in more detail to follow, the light emitter 16 may be sized, shaped, and dimensioned to generally conform to the profile (e.g., size, shape and/or dimension) of the subject's head 22. As illustrated in FIGS. 18A and 18B, the connector 20 may allow for the light emitter 16 to move with respect to the connecting device 18, providing additional adjustability in positioning and orienting the light emitter 16 in relation to the subject 12 and/or the chair 14. The connector 20 may allow for single or multi-dimensional (e.g., three-dimensional) movement of the light emitter 16. In this manner, the light emitter 16 may be placed in a preferred or desired location about the subject's head 22 or eyes (as shown in FIG. 17). In one example embodiment, the light emitter 16 may be in the shape of a curved elongated oval.

Figure 19:
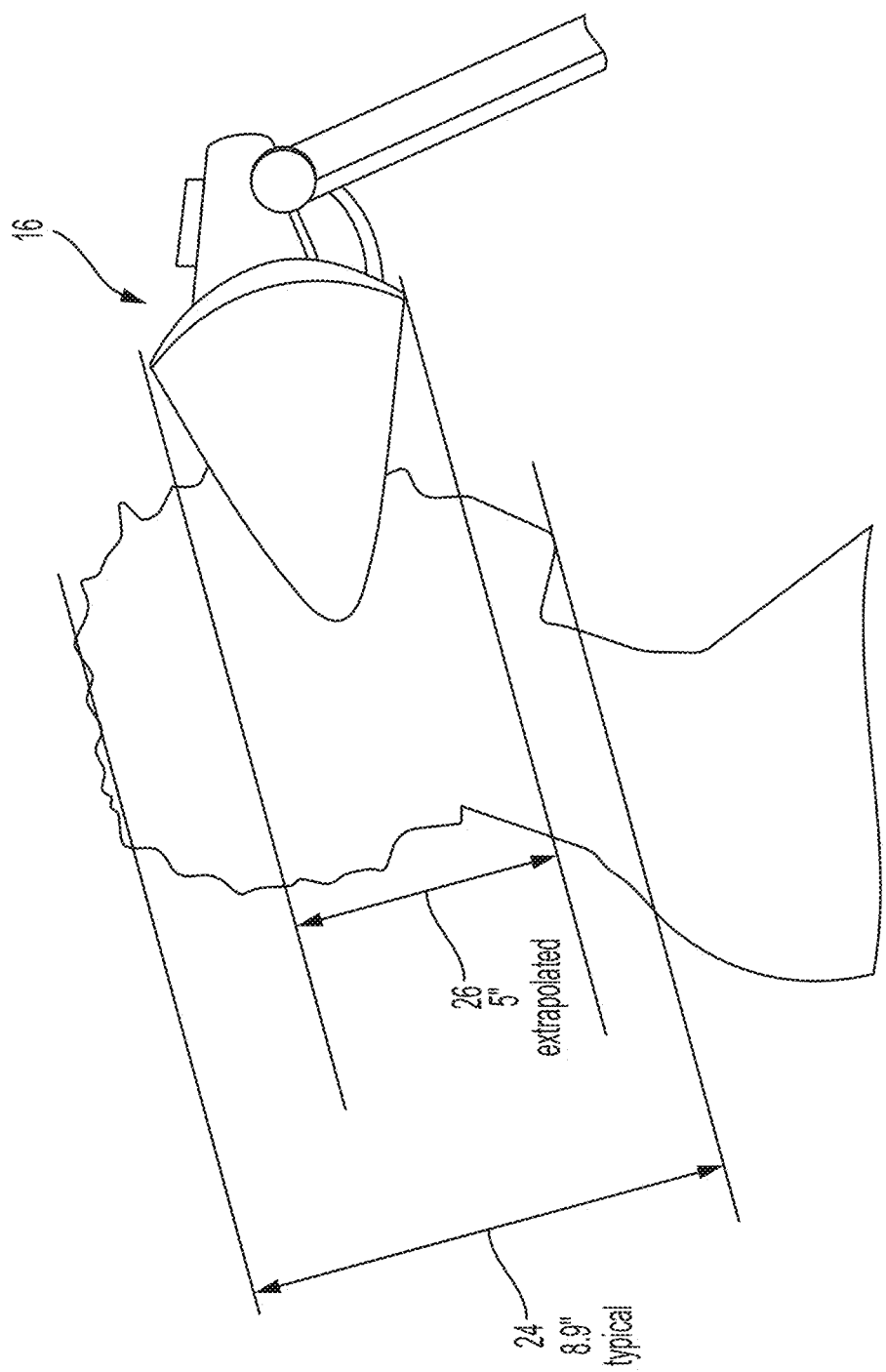
FIG. 19 illustrates an example light emitter with respect to a subject, according to an embodiment.

As illustrated in FIG. 19, the light emitter 16 may be sized based on the average human head height. That is, the average human head height may be used to define the height of the light emitter 16. In an example, the average human head may have a height 24. The height 24 may be about 8.9 inches (about 22.61 cm). The height 26 of the light emitter 16 may be dimensioned taking into account the height 24. For example, the height 26 may be about 5 inches (about 12.7 cm). The height 26 may be in the range of about 4.75 inches to about 5.25 inches (about 12.07 cm to about 13.34 cm), about 4.875 inches to about 5.125 inches (about 12.38 cm to about 13.02 cm), about 4.5 inches to about 5.5 inches (about 11.43 cm to about to about 13.97 cm), or about 4 inches to about 6 inches (about 10.16 cm to about 15.24 cm). Of course, it will be appreciated that the light emitter 16 may be smaller or larger in height than the aforementioned dimensions.

Figure 20:
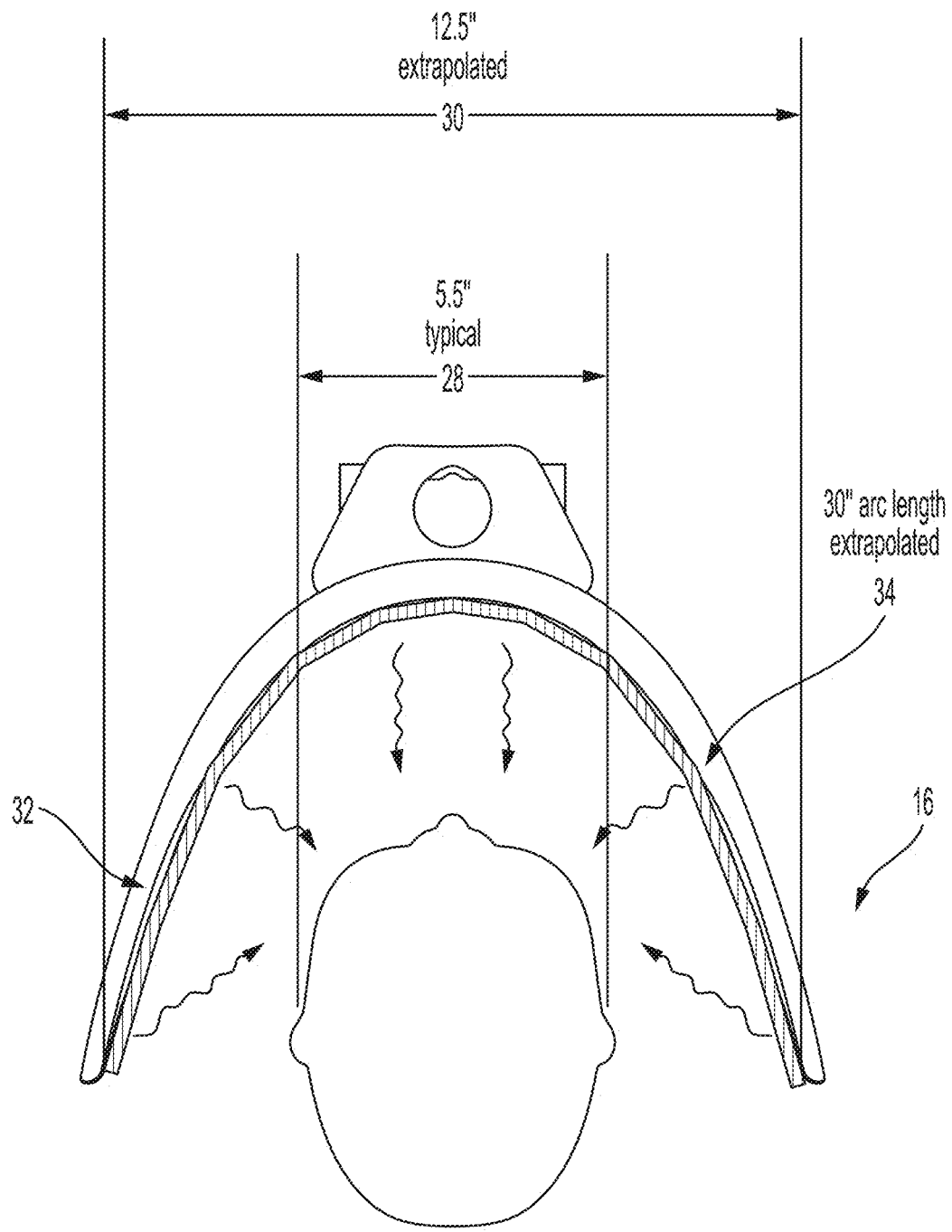
FIG. 20 illustrates an example light emitter with respect to a subject, according to an embodiment.

As illustrated in FIG. 20, the light emitter 16 may be sized based on the average human head width. That is, the average human head width may be used to define the width of the light emitter 16. In an example, the average human head may have a width 28. The width 28 may be about 5.5 inches (about 11.43 cm). The width 30 of the light emitter 16 may be dimensioned taking into account the width 28. For example, the width 30 may be about 12.5 inches (about 31.75 cm). The width 30 may be in the range of about 12.25 inches to about 12.75 inches (about 31.12 cm to about 32.39 cm), about 12 inches to about 13 inches (about 30.48 cm to about 33.02 cm), about 11.5 inches to about 13.5 inches (about 29.21 cm to about 34.29 cm), or about 11 inches to about 14 inches (about 27.94 cm to about 35.56 cm). Of course, it will be appreciated that the light emitter 16 may be smaller or larger in width than the aforementioned dimensions.

With continued reference to FIGS. 16-20, the light emitter 16 may include a housing, one or more printed circuit boards (PCBs), and a diffuser screen 32. The lighting emitter 16 and the diffuser screen 32 may be formed as described above with respect to FIGS. 2-9. The housing may be elongated and/or curved. The housing may contain or house the diffuser screen 32 and the one or more PCBs. For example, the PCBs may be placed between the housing and the diffuser screen 32. The diffuser screen 32 may be a diffuser material overlaid onto the PCBs. The PCBs and/or the diffuser screen 32 may be secured, either permanently or removably, to the housing using various fastening mechanisms, such as adhesive, screws, and/or retention clips. The light emitter 16 may be formed as one or more lighting units 40 as described above.

As illustrated in FIG. 20, the light emitter 16 may include the diffuser screen 32 at an inner surface of the light emitter 16. For example, the diffuser screen 32 may be an elongated and/or curved piece of translucent material. The diffuser screen 32 may have an arc length 34. The arc length 34 may be dimensioned taking into account the dimensions of the average human head. For example, the arc length 34 may be about 30 inches (about 76.2 cm). The arc length 34 may be about 25 inches to about 35 inches (about 63.5 cm to about 88.9 cm), about 26 inches to about 34 inches (about 66.04 cm to about 86.36 cm), about 27 inches to about 33 inches (about 68.58 cm to about 83.82 cm), about 28 inches to about 32 inches (about 71.12 cm to about 81.28 cm), or about 29 inches to about 31 inches (about 73.66 cm to about 78.74 cm).

In an embodiment, the diffuser screen 32 may be arranged as illustrated in FIG. 3 when in a laid flat arrangement. The laid flat arrangement of FIG. 3 may be an approximation of the diffuser screen 32 of the light emitter 16 if it were laid out flat. The laid flat diffuser screen 32 may have a length 36 along the major axis and a height 38 along the minor axis. The length 36 may be about the same as the arc length 34. In an example, the length 36 may be about 30 inches (about 76.2 cm). The height 38 may be about the same as the height 26. In an example, the height 38 may be about 5 inches (about 12.7 cm). The laid flat diffuser screen 32 may have an aspect ratio of 6:1. The diffuser screen 32 may have a surface area of about 118 square inches (about 761.29 square cm). The diffuser screen 32 may have a surface area about equal to the illuminated surface area of a 13 inch laptop screen.

With continued reference to FIGS. 3 and 16-20, the light emitter 16 and the diffuser screen 32 may curve about an axis. The light emitter 16 and diffuser screen 32 may curve about a vertical plane or vertical axis 33 (FIG. 18A). The light emitter 16 and diffuser screen 32 may curve about a horizontal plane or horizontal axis 35 (FIG. 18B). The light emitter 16 and diffuser screen 32 may have about a 6 inch (about 15.24 cm) bend radius about the vertical axis 33. The bend radius about the vertical axis 33 may be around the subject's brow (e.g., around the width of the subject's head). The bend radius about the vertical axis 33 may result in a bend of the light emitter 16 and the diffuser screen 32. The light emitter 16 and the diffuser screen 32 may have a second bend radius about the horizontal axis 35 (e.g., around the height of the subject's head). The second bend radius may result in a cup effect of the light diffuser 16 and diffuser screen 32. The second bend radius may be optional. Although not depicted in FIGS. 3 and 16-20, the PCBs may curve about the vertical plane or vertical axis and/or the horizontal plane or horizontal axis, as will be described in more detail to follow.

According to an embodiment, the individual zones of the light emitter 16 may be controlled by the controller sub-system 130, as described above, to emit one or more predetermined wavelengths of light from one or more zones or have no light emission from one or more zones. For example, as illustrated in FIG. 7D, the foveal zone of the light emitter 16 may emit one or more visual wavelengths of light, while the left peripheral and right peripheral zones emit only one or more non-visual wavelengths of light. As another example, the foveal zone of the light emitter 16 may emit no light, while the left peripheral and right peripheral zones emit only one or more non-visual wavelengths of light. As another example, the foveal zone of the light emitter 16 may emit only one or more non-visual wavelengths of light, while the left peripheral and right peripheral zones emit no light. In any configuration, the light may be applied directly to the foveal and/or peripheral regions of the user's eyes when the eyes are open, or when the eyes are closed.

In an embodiment, the diffuser material is omitted for one or more of the zones so that the full emitted spectrum of light wavelengths is directly applied to the user.

Room Embodiment

According to an example embodiment, at least a portion of the system 100 may be implemented as a household or commercial device to be placed in a room setting.

Figure 21A:
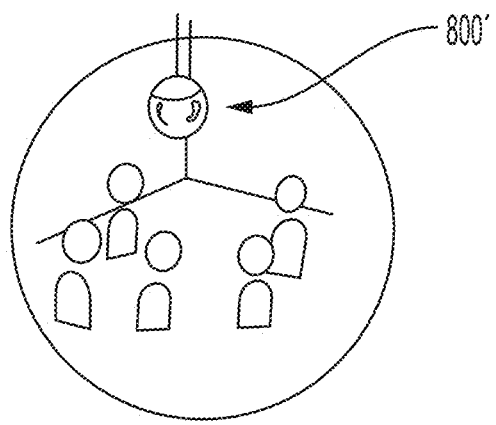
FIGS. 21A, 21B, and 21C illustrates example room lighting devices, according to different embodiments.
Figure 21B:
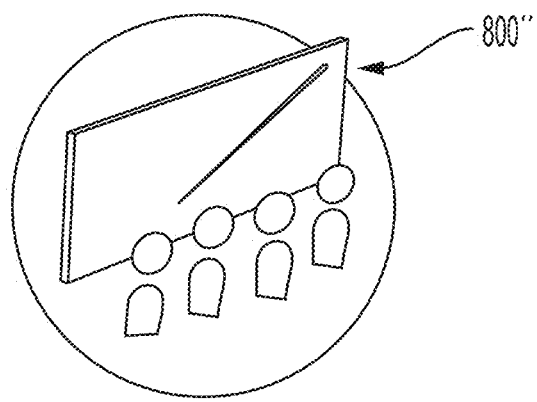
Figure 21C:
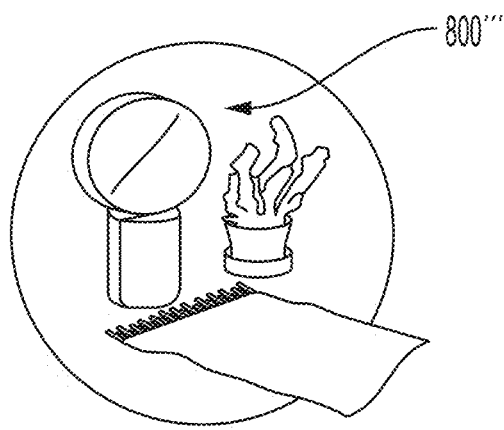

As illustrated in FIGS. 21A-21C, the light emitter sub-system 140 may be configured to emit light to an area via a central emitter 800, such as a ceiling projector 800' (FIG. 21A), a wall panel 800" (FIG. 21B), and/or a lamp 800''' (FIG. 21C). According to an embodiment, the area may be of an appropriate size in which one person or a plurality of people can sit or stand. For example, the area may be a bedroom, a living room, or other partially or fully enclosed area.

For example, the system 100 may be configured to emulate a predetermined spectrum of light, such as a measured spectrum of light emitted from the night sky, to one or more users. According to an embodiment, the predetermined spectrum of light may be according to a spectrum of light measured or determined from a particular geographic location at a particular time of the year and at a particular time of the day or night. For example, a desired light spectrum in a room may be the light spectrum of the nighttime sky in a remote geographic location (with little or no light pollution).

The sensor sub-system 110 may be used to sense or measure a spectrum of light in a room. For example, the spectrum of light in a room may come from ambient lights sources from within a room (such as lights from electronic devices) and/or from external to the room. The sensor sub-system 110 may sense or measure the light spectrum (both visual and non-visual light spectrum) in a darkened room. Based on the sensed or measured light spectrum, controller sub-system 130 may compare the sensed or measured light spectrum with a desired light spectrum and determine any wavelengths of light that are deficient in the darkened room relative to the desired light spectrum and/or determine any wavelengths of light that are in excess in the darkened room relative to the desired light spectrum.

When one or more wavelengths of light are determined to be in excess in the darkened room relative to the desired light spectrum, the controller sub-system 130 may inform the user (such as via a user interface) that of a range of wavelengths that are in excess and/or recommend further darkening of the room.

When one or more wavelengths of light are determined to be deficient in the darkened room relative to the desired light spectrum, the controller sub-system 130 may further determine one or more light wavelengths and intensities to emulate the desired light spectrum. The controller sub-system 130 may control the central emitter 800 to emit only the one or more light wavelengths and intensities to emulate the desired light spectrum in the darkened room.

As an example, a desired light spectrum may contain a predetermined amount of UV and IR light. For a darkened room that is determined by the sensor sub-system 110 and controller sub-system 130 to have no UV and IR light, the controller sub-system 130 may control the central emitter 800 to emit UV and IR light to match the desired light spectrum. For example, the system 100 may be configured to entrain the user to a desired circadian rhythm. According to an embodiment, the system 100 may include a predetermined cycle and timing of light and dark of a natural day, with a predetermined sunrise (dawn) and a predetermined sunset (dusk) with the predetermined types and amounts of light described above.

Eyes-Closed Operation

In the embodiments described above, the light emitting sub-system 140 may be configured to emit light to a user's eyes while the user's eyes are closed. In particular, the light emitted from the light emitting sub-system 140 is transmitted through the user's eyelids. By operating the system 100 while the user's eyes are closed, the visual stimulus perceived by the user is isolated to the light emitted by the light-emitting sub-system 140.

In one embodiment, the sensor sub-system 110 may determine when the user's eyes are open or closed. For example, with respect to the embodiments described above when the light emitter sub-system 140 is configured to emit light to one user, the sensor sub-system 110 may sense or determine an open position or a closed position of the user's eyes. When the user's eyes are sensed or determined to be open, controller sub-system 130 may control the light emitter sub-system 140 to emit light at a first predetermined intensity, may stop emitting only visual light and/or non-visual light. When the user's eyes are sensed or determined to be closed, the controller sub-system 130 may control the light emitter sub-system 140 to emit light at a second predetermined intensity to account for diffusion through or translucency of light the user's eyelids. In one embodiment, the controller sub-system 130 may continuously monitor the open/close status of the user's eyes (e.g., at predetermined intervals), and control the light emitter sub-system 140 to refrain from emitting light until it is sensed that the user's eyes are closed.

The embodiments described above may be generally used to entrain a user's brainwaves to a desired wavelength.

Figure 22:
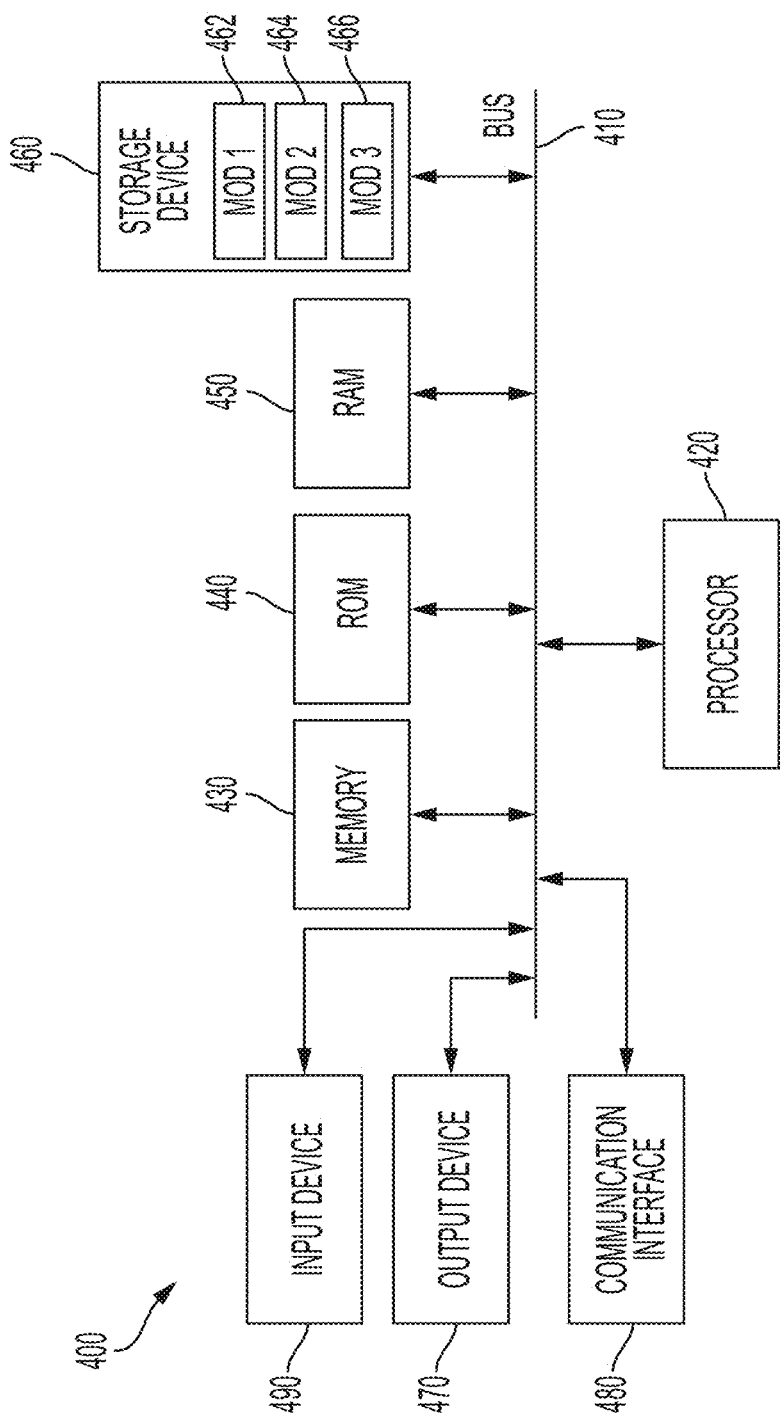
FIG. 22 illustrates an example computer system.

With reference to FIG. 22, an exemplary system of the controller sub-systems described above includes a general-purpose computing device 400, including a processing unit (CPU or processor) 420 and a system bus 410 that couples various system components including the system memory 430 such as read-only memory (ROM) 440 and random access memory (RAM) 450 to the processor 420. The system 400 can include a cache of high-speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read-only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (just X, or just Y, or just Z) and multiple items (i.e., {X and Y}, {X and Z}, {Y and Z}, or {X, Y, and Z}). "At least one of" is not intended to convey a requirement that each possible item must be present.

Although the foregoing description is directed to the embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

We claim:

1. A system for altering brainwaves, the system comprising:
    a first stimulus emitter comprising a plurality of lights arranged in an array, wherein the plurality of lights are configured to direct light towards a user; and
    a controller comprising a processor and a non-transitory computer-readable storage medium having instructions stored which, when executed by the processor, cause the processor to:
        control the first stimulus emitter to emit a first stimulus at a first intensity and a first oscillation frequency,
        control the first stimulus emitter to adjust the first stimulus to a second oscillation frequency,
        control a second stimulus emitter, comprising at least one sound emitter configured to direct sound towards a user, to emit a second stimulus at a second intensity and a third oscillation frequency, and
        control the second stimulus emitter to adjust the second stimulus to a fourth oscillation frequency,
    wherein the array is divided into a plurality of zones comprising a first zone having a first plurality of lights and a second zone having a second plurality of lights,
    wherein the first zone is a foveal zone configured to emit the first stimulus to a foveal area of an eye of the user, wherein the second zone is a peripheral zone configured to emit the first stimulus to a peripheral area of the eye of the user,
    wherein the first stimulus emitted from the foveal zone is controlled independently from the first stimulus emitted from the peripheral zone, and
    wherein the oscillation frequency of the foveal zone is different than the oscillation frequency of the peripheral zone.

2. The system of claim 1, wherein the first oscillation frequency and the third oscillation frequency comprise at least one frequency corresponding to a brainwave state, wherein the second oscillation frequency and the fourth oscillation frequency comprise at least one frequency corresponding to a different brainwave state.

3. The system of claim 2, wherein the brainwave state comprises one of:
    a gamma state having a range of frequencies greater than 40 Hz;
    a beta state having a range of frequencies between about 13 Hz and about 39 Hz;
    an alpha state having a range of frequencies between about 7 Hz and about 13 Hz;
    a theta state having a range of frequencies between about 4 Hz and about 7 Hz; or
    a delta state having a range of frequencies less than about 4 Hz.

4. The system of claim 1, wherein the first oscillation frequency and the third oscillation frequency comprise at least one frequency within a range of frequencies corresponding to one brainwave state, wherein the second oscillation frequency and the fourth oscillation frequency comprise a different frequency within the range of frequencies corresponding to the one brainwave state.

5. The system of claim 4, wherein the range of frequencies corresponding to one brainwave state comprises:
    a gamma state having a range of frequencies greater than 40 Hz;
    a beta state having a range of frequencies between about 13 Hz and about 39 Hz;
    an alpha state having a range of frequencies between about 7 Hz and about 13 Hz;
    a theta state having a range of frequencies between about 4 Hz and about 7 Hz; or
    a delta state having a range of frequencies less than about 4 Hz.

6. The system of claim 1, wherein the peripheral zone is configured to emit the first stimulus to only the peripheral area of the eye of the user.

7. The system of claim 1, wherein the first stimulus emitted from the first zone is configured to be visually perceptible to the user, wherein the first stimulus emitted from the second zone is configured to be visually imperceptible to the user.

8. The system of claim 1, further comprising a diffuser configured to diffuse the light emitted from the first stimulus emitter.

9. The system of claim 8, wherein an ultraviolet (UV) absorption property in a first portion of the diffuser is different from a UV absorption property in a second portion of the diffuser.

10. The system of claim 1, wherein the first stimulus emitter is curved and adapted to be placed at least partially around a user's head and in front of the user's eyes.

11. The system of claim 10, further comprising a diffuser that diffuses light emitted by the array, wherein the array and the diffuser are curved and adapted to be placed at least partially around a user's head and in front of the user's eyes.

12. The system of claim 1, wherein the instructions, when executed by the processor, cause the processor to:
    receive, from at least one sensor configured to sense one or more biometric markers of the user, data associated with the one or more biometric markers of the user,
    determine a brain state of the user based on the data associated with the one or more biometric markers of the user,
    determine a desired brain state of the user based on input from the user, and
    control the first stimulus emitter and the second stimulus emitter to apply the first stimulus and the second stimulus to the user based on the determined brain state and the desired brain state.

13. The system of claim 1, further comprising the second stimulus emitter.

\* \* \* \* \*